US012647706B2

(12) United States Patent
Silver et al.

(10) Patent No.: US 12,647,706 B2
(45) Date of Patent: Jun. 2, 2026

(54) SPEAKER WITH SINGLE DRIVER FORCE CANCELLATION

(71) Applicant: Meta Platforms Technologies, LLC, Menlo Park, CA (US)

(72) Inventors: Jason Silver, Sunnyvale, CA (US); John Stewart, San Francisco, CA (US); Michael Zalisk, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 230 days.

(21) Appl. No.: 18/654,743

(22) Filed: May 3, 2024

(65) Prior Publication Data

US 2024/0292136 A1 Aug. 29, 2024

Related U.S. Application Data

(63) Continuation-in-part of application No. 18/405,295, filed on Jan. 5, 2024.

(Continued)

(51) Int. Cl.
*H04R 1/02* (2006.01)

(52) U.S. Cl.
CPC .................................... *H04R 1/02* (2013.01)

(58) Field of Classification Search
CPC . H04R 1/02; H04R 1/24; H04R 9/043; H04R 9/045; H04R 2499/15; H04R 1/2834

(Continued)

(56) References Cited

U.S. PATENT DOCUMENTS 6,466,682 B2 10/2002 An
6,839,443 B2 1/2005 Fukuda (Continued)

FOREIGN PATENT DOCUMENTS

EP 2429217 A1 3/2012
EP 3734988 A1 11/2020

(Continued)

OTHER PUBLICATIONS

International Preliminary Report on Patentability for International Application No. PCT/US2024/016667, mailed Sep. 4, 2025, 7 pages.

(Continued)

*Primary Examiner* — Sean H Nguyen
(74) *Attorney, Agent, or Firm* — Greenberg Traurig, LLP

(57) ABSTRACT

A speaker system can include a first moving mass, such as a diaphragm, coupled to a fixed frame via a first non-rigid suspension and coupled to a voice coil. The speaker system can include a second moving mass, such as a motor assembly, coupled to the fixed frame. The speaker system can include a passive radiator coupled to the fixed frame via a second non-rigid suspension. The motor assembly and the diaphragm are configured to move in response to an audio drive signal, causing a pressure to be generated and a first force to be generated on the fixed frame. The fixed frame is configured so that the pressure is shunted to the first passive radiator that is configured to generate a second force in response to the shunted pressure causing a second force on the fixed frame that cancels at least a portion of the first force.

20 Claims, 21 Drawing Sheets

Related U.S. Application Data

(60) Provisional application No. 63/478,628, filed on Jan. 5, 2023.

(58) Field of Classification Search
USPC .......................................................... 381/386
See application file for complete search history.

(56) References Cited

U.S. PATENT DOCUMENTS

| | | | | |
|---|---|---|---|---|
| 9,094,747 | B2 | 7/2015 | Rayner | |
| 9,241,206 | B2 | 1/2016 | Nevill | |
| 9,294,841 | B2 | 3/2016 | Sahyoun | |
| 9,743,205 | B2 | 8/2017 | Stetson | |
| 9,820,035 | B2 | 11/2017 | Dominijanni et al. | |
| 9,980,069 | B2 | 5/2018 | Hartwell | |
| 10,244,312 | B2 | 3/2019 | Rousseau et al. | |
| 10,327,083 | B2 | 6/2019 | Rusconi Clerici Beltrami et al. | |
| 10,351,419 | B2 | 7/2019 | Gao et al. | |
| 10,631,096 | B1 | 4/2020 | Garcia Selva et al. | |
| 10,645,486 | B1 * | 5/2020 | Rodgers | H04R 1/2834 |
| 10,812,900 | B2 | 10/2020 | Khenkin et al. | |
| 11,450,113 | B1 | 9/2022 | Vaziri | |
| 11,570,547 | B2 | 1/2023 | Silver | |
| 2011/0274308 | A1 | 11/2011 | Doh et al. | |
| 2013/0213628 | A1 * | 8/2013 | Litovsky | H04R 1/2834 165/185 |
| 2014/0266260 | A1 | 9/2014 | Wurzinger et al. | |
| 2016/0249136 | A1 | 8/2016 | Kim | |
| 2017/0272866 | A1 | 9/2017 | Griffiths | |
| 2018/0270568 | A1 * | 9/2018 | Litovsky | H04R 1/2834 |
| 2022/0400338 | A1 * | 12/2022 | Silver | H04R 1/02 |
| 2023/0188895 | A1 * | 6/2023 | Tiene | H04R 7/045 381/349 |
| 2024/0031712 | A1 | 1/2024 | Corynen | |
| 2024/0236556 | A1 | 7/2024 | Silver | |
| 2024/0284096 | A1 | 8/2024 | Silver | |
| 2025/0039612 | A1 | 1/2025 | Zhou | |
| 2025/0071471 | A1 | 2/2025 | Zhang et al. | |

FOREIGN PATENT DOCUMENTS

| | | | |
|---|---|---|---|
| WO | 2010076656 | A2 | 7/2010 |
| WO | 2022048810 | A1 | 3/2022 |

OTHER PUBLICATIONS

International Search Report and Written Opinion for International Application No. PCT/US2024/016667, mailed May 21, 2024, 10 pages.

Analog Devices, "High Performance, Low Noise Studio Microphone with MEMS Microphones, Analog Beamforming, and Power Management," Application Note AN-1328, 2014, 9 pages, Retrieved from the Internet: URL: https://www.analog.com/media/en/technical-documentation/application-notes/an-1328.pdf.

Johnson R.C., "MEMS Mics Taking Over," EE Times, Dec. 2, 2014, 2 pages, Retrieved from the Internet: URL: https://www.eetimes.com/mems-mics-taking-over/.

Martin D.T., "Design, Fabrication, and Characterization of a MEMS Dual-Backplate Capacitive Microphone," University of Florida, 2007, 250 pages, Retrieved from the Internet: URL: http://ufdcimages.uflib.ufl.edu/UF/E0/01/75/26/00001/martin_d.pdf.

ST Application Note, "Tutorial for MEMS Microphones," Mechanical Specifications, Construction details, Feb. 2017, 20 pages, Retrieved from the Internet: URL: https://www.st.com/resource/en/application_note/dm00103199-Tutorial-for-mems-microphones-stmicroelectronics.pdf.

* cited by examiner

SPEAKER WITH SINGLE DRIVER FORCE CANCELLATION

CROSS-REFERENCE TO RELATED APPLICATIONS

This application is a continuation-in-part of U.S. patent application Ser. No. 18/405,295, filed on Jan. 5, 2024 and titled "SPEAKER WITH SINGLE DRIVER FORCE CANCELLATION," which claims priority to U.S. Provisional Patent Application No. 63/478,628, filed on Jan. 5, 2023 and titled "SINGLE DRIVER FORCE CANCELING WITH SPRING BETWEEN MOTOR AND BASKET." The specifications of these applications are herein incorporated by reference in their entirety.

TECHNICAL FIELD

The present disclosure is directed to a speaker/loudspeaker, or a device that produces sound.

BACKGROUND

When a speaker is mounted on a wearable device, such as an artificial reality (XR) device (e.g., virtual reality (VR) headset, mixed reality (MR) headset, or augmented reality (AR) glasses), it may generate vibration to the whole device, causing unwanted shaking and contamination to signals. For example, an inertial measurement unit (IMU) may be included in an XR device for tracking of body and head motion of the wearer during XR use, and contamination of IMU signals can result in inaccurate measurements that are difficult to correct. Audio leakage from a wearable device may also be undesirable, as a wearer may wish to maintain privacy. However, known speakers, particularly those that are manufactured for better bass performance, generally have increased shaking and increased leakage that is unsuitable for many wearable device applications.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
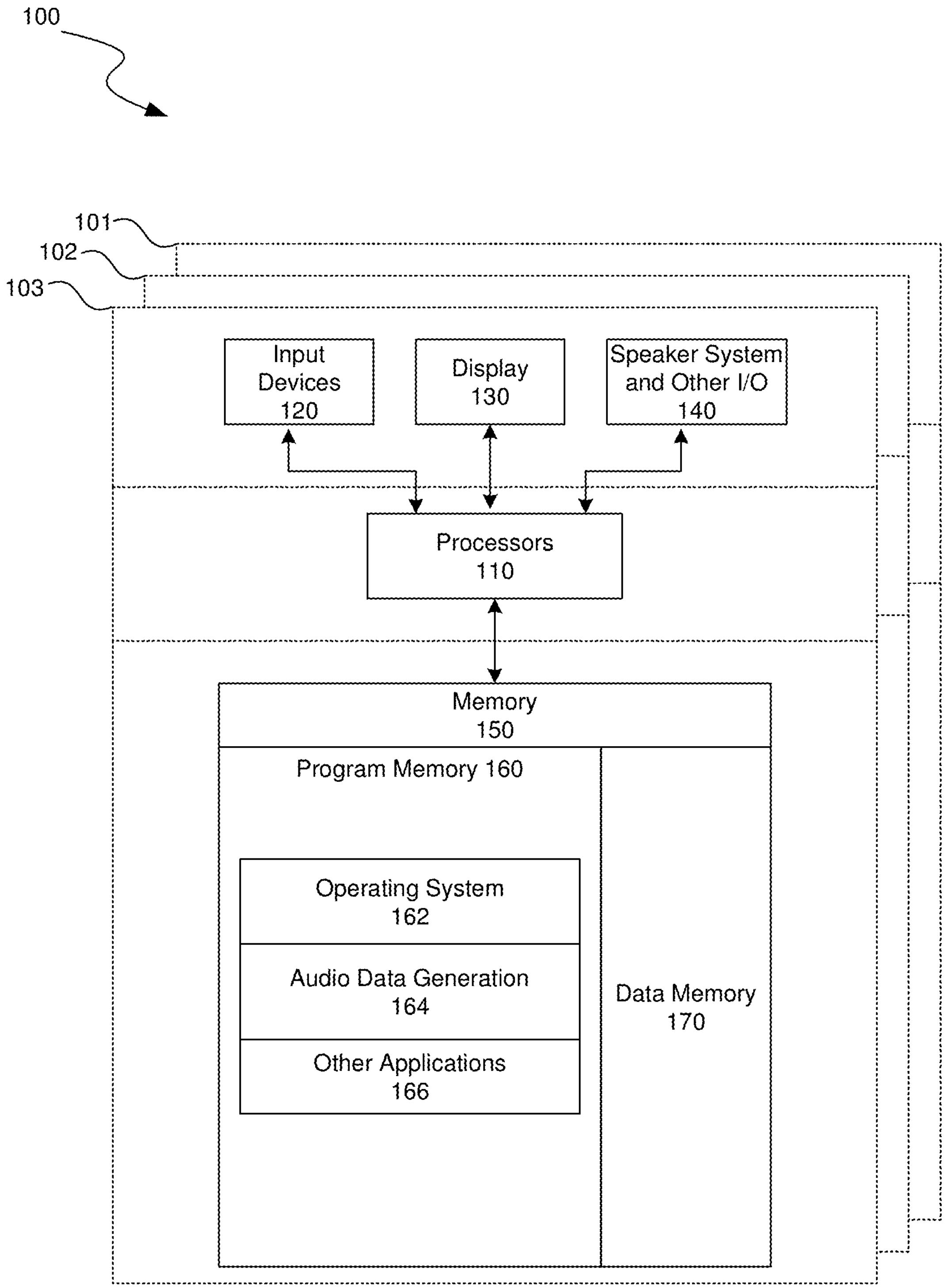
FIG. 1 is a block diagram illustrating an overview of devices on which some implementations of the present technology can operate.

Aspects of the present disclosure are directed to a speaker system that uses a single driver that results in both force and moment canceling. The speaker system can be mounted within a structure, such as a head mounted display. The first moving mass can include a diaphragm, a voice coil, and a diaphragm surround. A primary suspension (i.e., the diaphragm surround) can be attached to a fixed flange or fixed basket/frame to couple the first moving mass to the structure. The second moving mass or driver, can include a magnet core/motor assembly. A secondary suspension (e.g., a decoupling flat spring) can be coupled between the frame and the second moving mass. The secondary suspension can reduce shaking and contamination, from the magnet core/motor assembly, from seeping into the frame and subsequently to other components of a head mounted display.

The speaker system can be configured so that the natural frequency and resonance quality "Q" of the first moving mass and primary suspension is substantially the same as the natural frequency and resonance quality "Q" of the second moving mass and secondary suspension. In some implementations, the speaker system can also include air cavities above and below the motor assembly which are sized and configured to result in both force and moment canceling. As a result, the contamination signals caused by the speaker that would otherwise be transmitted to the basket and to the structure are further substantially mitigated.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

In some implementations, the speaker system can include a first moving mass, such as a diaphragm, coupled to a fixed frame via a first non-rigid suspension and coupled to a voice coil. The speaker system can include a second moving mass, such as a motor assembly, rigidly (i.e., directly, without an intervening suspension element) coupled to the fixed frame. The speaker system can include a passive radiator coupled to the fixed frame via a second non-rigid suspension. The motor assembly and the diaphragm are configured to move in response to an audio drive signal, causing a pressure to be generated by the motor assembly and a first force to be generated by the diaphragm. The fixed frame is configured so that the pressure is shunted to the first passive radiator that is configured to generate a second force in response to the shunted pressure on the motor assembly, where the second force generally cancels the first force.

In some implementations the speaker system can include a first moving mass, such as a diaphragm, coupled to a fixed frame via a first non-rigid suspension and coupled to a voice coil. The speaker system can further include a second moving mass, such as a motor assembly, coupled to the fixed frame via a non-rigid second suspension, where the motor assembly is configured to move the voice coil in response to an audio drive signal applied through the motor assembly. The speaker system can further include a passive radiator coupled to the fixed frame via a non-rigid third suspension.

In some implementations the speaker system can include a hole through a motor assembly to provide force cancellation. The diameter and length of the hole can be increased, in some implementations, by including a helical shaped path within the motor hole, such as by inserting an Archimedes screw. In some additional or alternative cases, the diameter and length can be increased using a spiral cap that is placed over the motor hole, where the spiral cap provides a flat spiral hole below the driver.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that generates audio by driving a speaker. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on.

Speaker system and other I/O devices 140 can also be coupled to the processor, which can include one or more speakers with a diaphragm and motor assembly connected by a suspension to a fixed structure (i.e., fixed basket/frame), reducing vibration from the motor assembly and diaphragm into the fixed structure. In some implementations, these one or more speakers can also include air cavities above and below the motor assembly which are sized and configured to result in both force and moment canceling, further reducing vibration from the motor assembly into the fixed structure.

Speaker system and other I/O devices 140 can further include other I/O devices such as a network chip or card, video chip or card, audio chip or card, USB, firewire or other external device, camera, printer, CD-ROM drive, DVD drive, disk drive, etc. In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, audio data generation 164, and other application programs 166. Memory 150 can also include data memory 170 that can include, e.g., a mapping of audio data to speaker driver properties, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
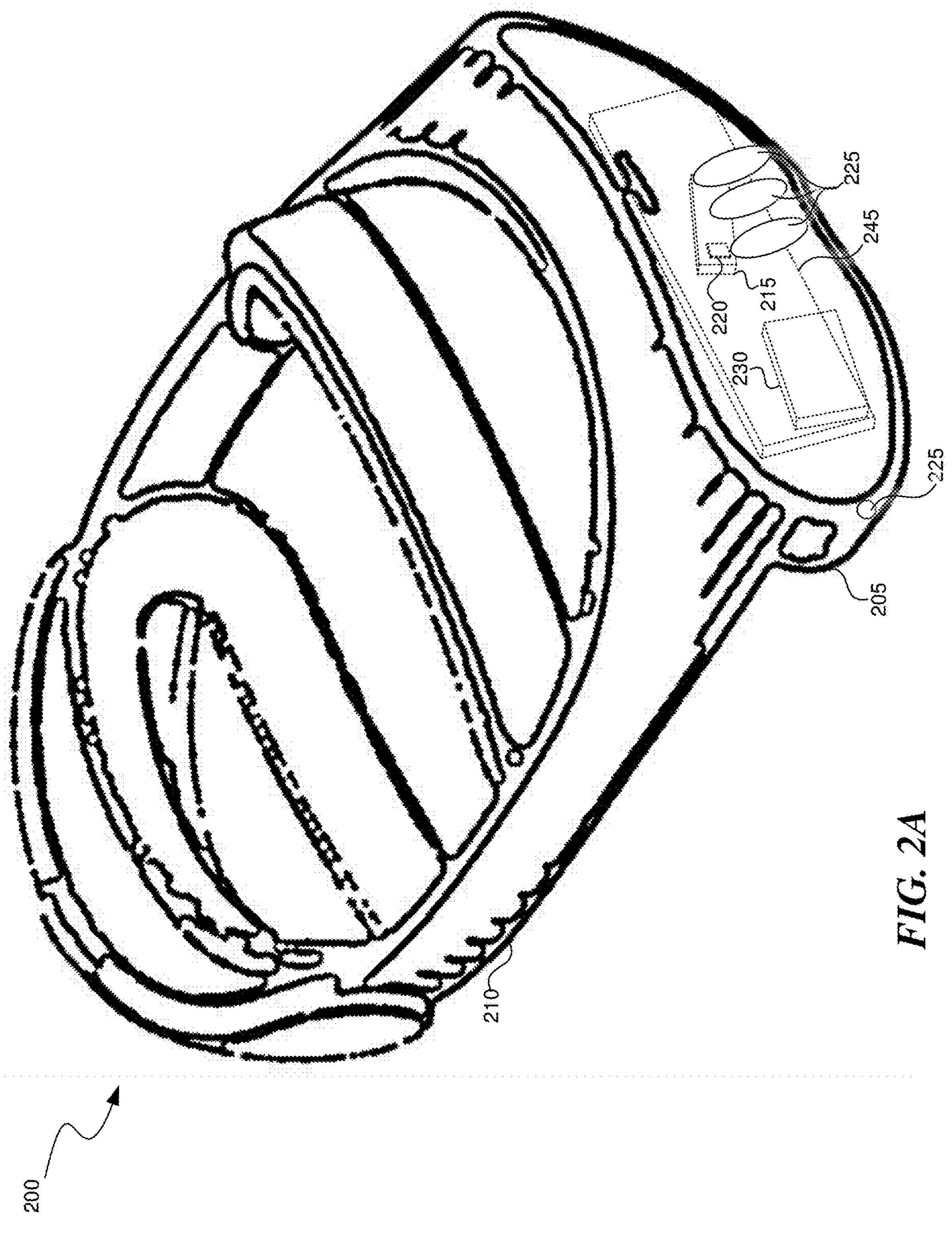
FIG. 2A is a wire diagram illustrating a virtual reality headset which can be used in some implementations of the present technology.

FIG. 2A is a wire diagram of a virtual reality head-mounted display (HMD) 200, in accordance with some embodiments. In this example, HMD 200 also includes augmented reality features, using passthrough cameras 225 to render portions of the real world, which can have computer generated overlays. The HMD 200 includes a front rigid body 205 and a band 210. The front rigid body 205 includes one or more electronic display elements of one or more electronic displays 245, an inertial motion unit (IMU) 215, one or more position sensors 220, cameras and locators 225, and one or more compute units 230. The position sensors 220, the IMU 215, and compute units 230 may be internal to the HMD 200 and may not be visible to the user. In various implementations, the IMU 215, position sensors 220, and cameras and locators 225 can track movement and location of the HMD 200 in the real world and in an artificial reality environment in three degrees of freedom (3DoF) or six degrees of freedom (6DoF). For example, locators 225 can emit infrared light beams which create light points on real objects around the HMD 200 and/or cameras 225 capture images of the real world and localize the HMD 200 within that real world environment. As another example, the IMU 215 can include e.g., one or more accelerometers, gyroscopes, magnetometers, other non-camera-based position, force, or orientation sensors, or combinations thereof, which can be used in the localization process. One or more cameras 225 integrated with the HMD 200 can detect the light points. Compute units 230 in the HMD 200 can use the detected light points and/or location points to extrapolate position and movement of the HMD 200 as well as to identify the shape and position of the real objects surrounding the HMD 200.

The electronic display(s) 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
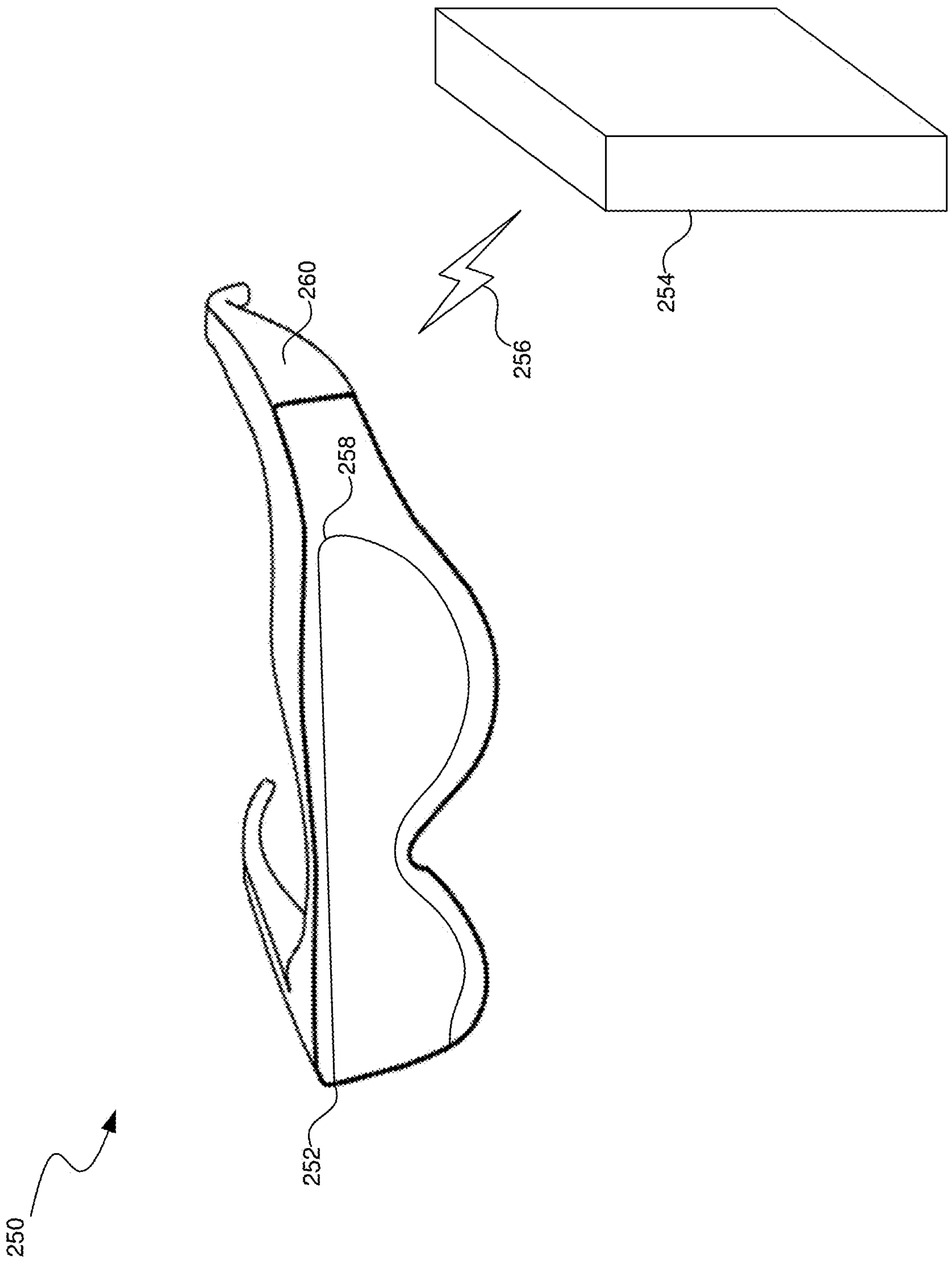
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHZ link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
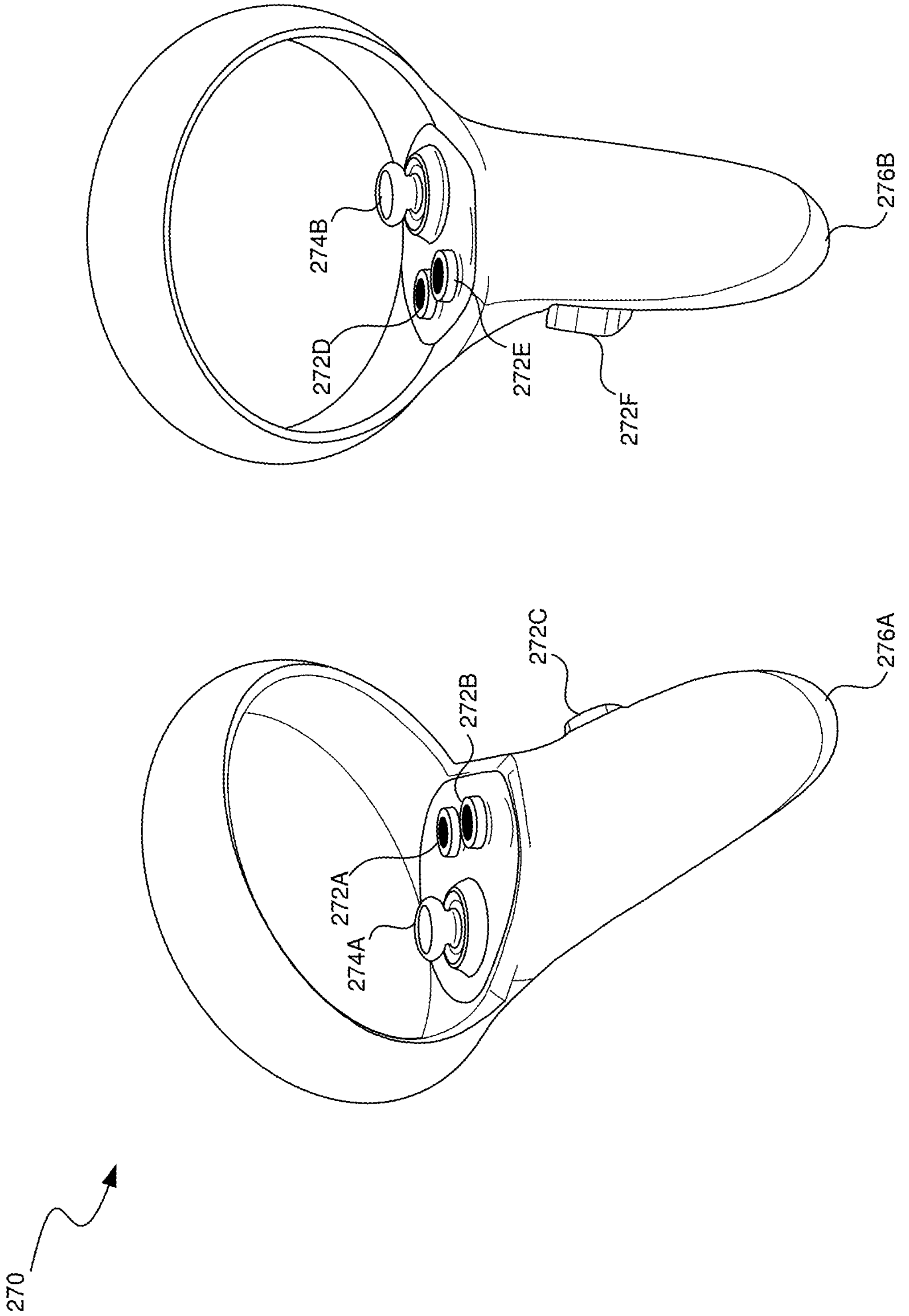
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
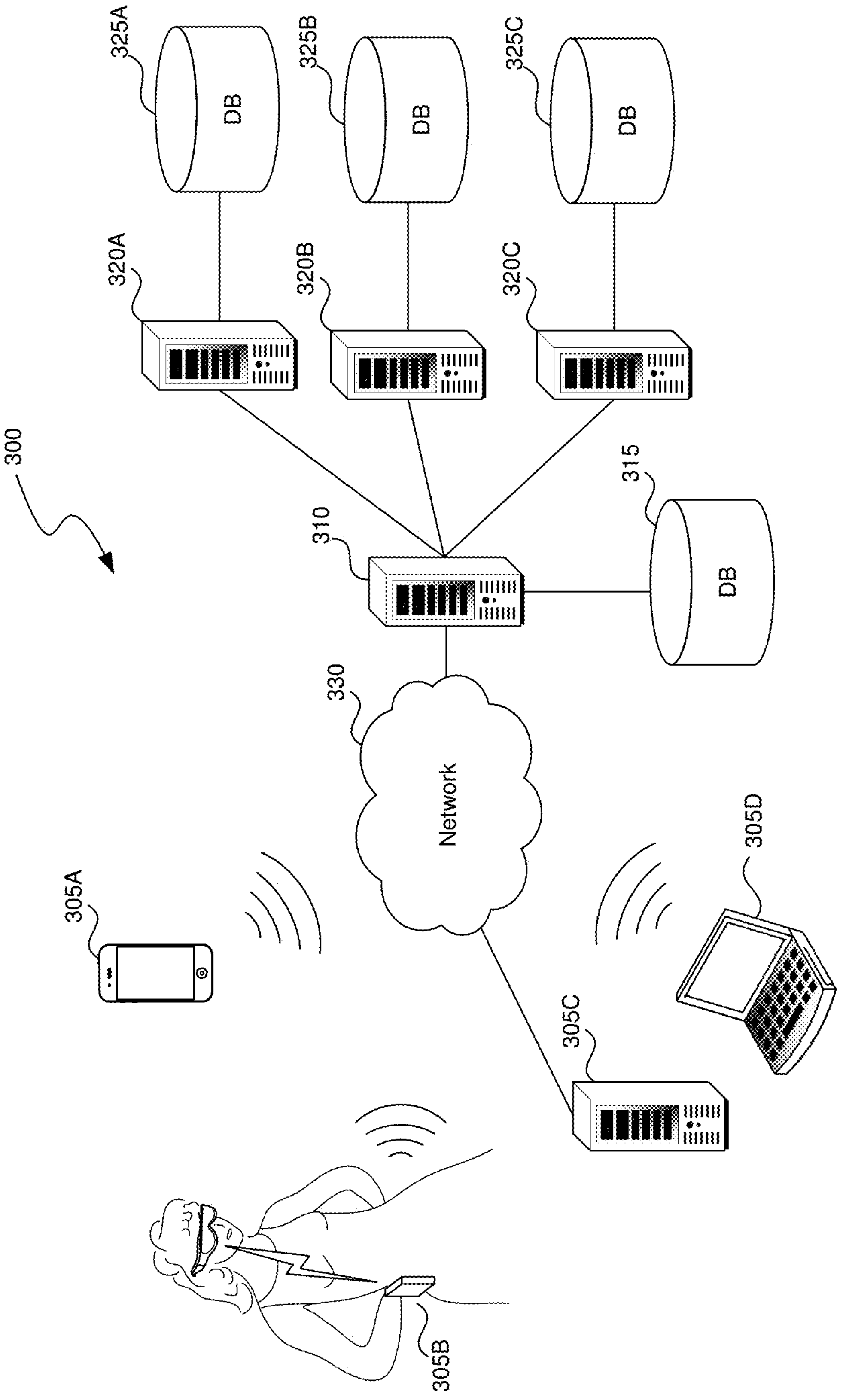
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

As described above, a speaker generates sound through the vibration of the diaphragm. When the speaker is mounted on a wearable device, such as an XR device, or wrist-worn devices such as a smart watch, it may generate vibrations of the wearable device that are detected by an inertial measurement unit (IMU) of the wearable device, interfere with a sensitive component such as a MEMS mirror, cause unwanted noise interference, etc. When these vibrations are detected by an IMU, for example, they can be "contamination signals", which can reduce motion tracking accuracy. These contamination signals may be difficult to eliminate by purely algorithmic processing due to a nonlinear, time varying, non-quantified gyroscope response to audio-band vibrations. A known mitigation approach is using a speaker system with a dual driver module, which includes two drivers moving in opposite directions to cancel the forces (i.e., vibrations) caused by the speaker. However, this approach requires two independent moving voice coils and diaphragms that must be matched. Drawbacks of this known approach include the increased cost for having two drivers, decreased packaging efficiency due to having to house both drivers, and increased weight.

In contrast to known approaches, implementations disclosed herein utilize a single driver and a non-rigid suspension/spring that couples the second moving mass to the fixed frame, and functions as a decoupling spring. The movement of the second moving mass in response to the single driver signal absorbs the magnetic force on the motor (instead of transmitting to the fixed basket), and the second suspension force cancels out the primary suspension force transmitted to the fixed basket by the first moving mass (i.e., diaphragm and voice coil) in response to the single driver.

Figure 4:
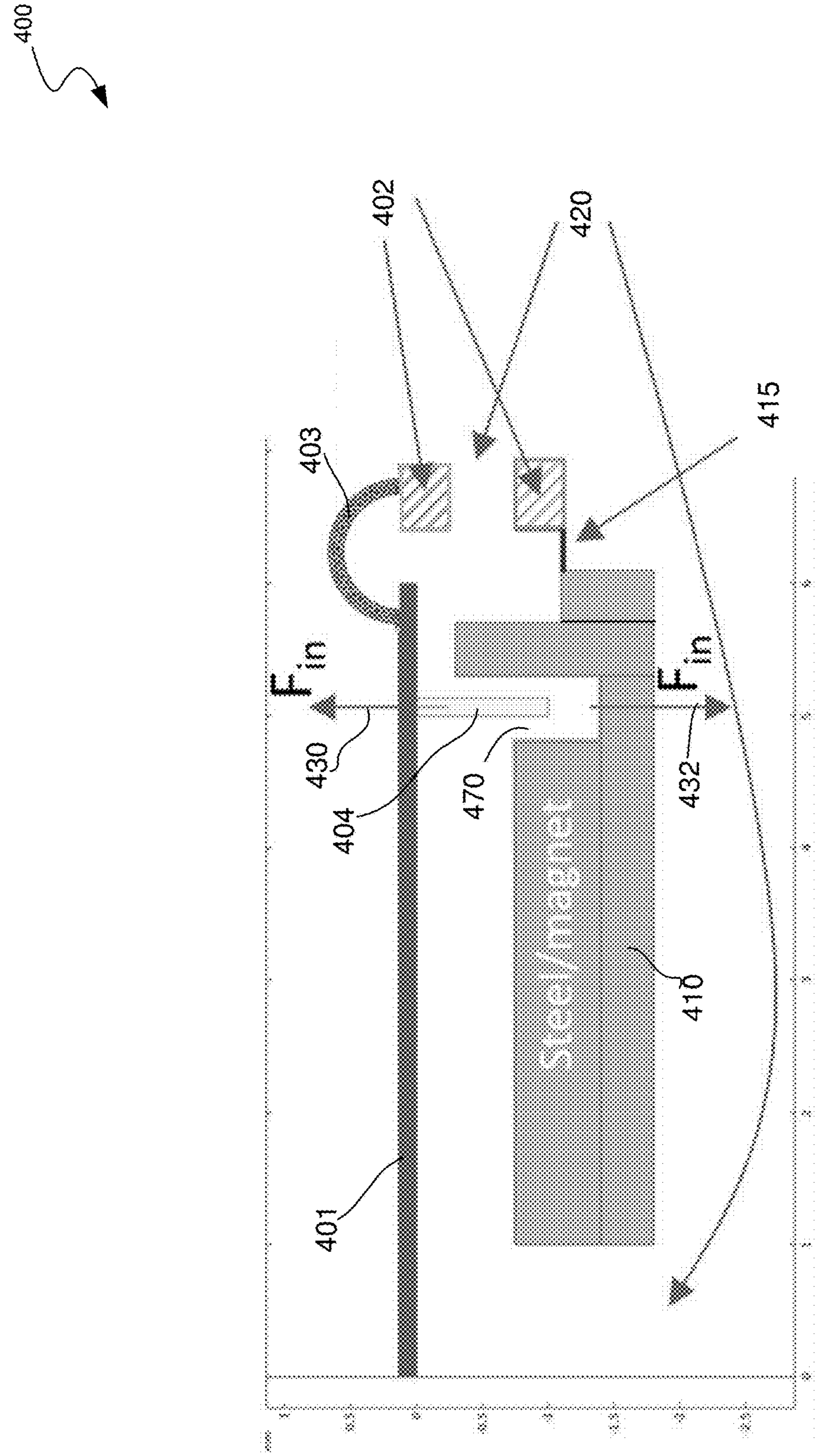
FIG. 4 is a cross-sectional view illustrating a speaker system used for some implementations of the present technology.

FIG. 4 is a cross-sectional view illustrating a speaker system 400 used for some implementations of the present technology. Speaker system 400 includes a single plane decoupling spring 415. System 400 includes a diaphragm 401 (i.e., part of the first moving mass including the voice coil) that is coupled to a fixed basket/frame 402, or housing, of the device/structure that contains the speaker system, such as HMD 200, via a primary suspension 403 or surround 403.

In some implementations, diaphragm 401 is a thin, semi-rigid membrane which is configured to generate sound pressure waves when vibrated. Diaphragm 401 includes a front surface and a back surface. In some implementations, surround 403 is a spring shaped as a half roll and is formed from rubber. Surround 403 suspends diaphragm 401 and is configured to flex and allow movement of diaphragm 401.

System 400 further includes a voice coil 404. Voice coil 404 in some implementations is metal wire wound tightly around a cylindrical structure and is configured to generate a magnetic field when current (i.e., an audio drive signal) is applied. A base of voice coil 404 is coupled to the back surface of diaphragm 401. In some implementations, voice coil 404 is coupled to the end of diaphragm 401 at a substantially close distance to surround 403.

Voice coil 404 is positioned within the magnetic air gap 470 of motor assembly 410. During speaker operation, current is applied to the voice coil which generates a magnetic field. The magnetic field generated by the voice coil interacts with a magnetic field generated by the steel motor assembly, generating a magnetic force causing the voice coil to move in an up and down motion with an equal and opposite force (creating the desired sound from the diaphragm 401), and causing motor assembly 410 to move in the opposite direction (creating unwanted vibration). The up and down movement of the voice coil causes the diaphragm to vibrate, with the front surface of the diaphragm generating positive sound pressure waves that travel through the air from the front of the speaker system.

System 400 further includes a steel/magnet/motor assembly 410 (i.e., the second moving mass, also referred to as the "driver", "hard part" or "motor yoke"). Motor assembly 410 is coupled to fixed basket/frame 402 via a decoupling spring 415 (i.e., secondary suspension). In the implementation of FIG. 4, spring 415 is a flat spring, but it may be a half roll spring, a spring of another shape, or another suspensions device. In some implementations, motor assembly 410 includes a magnet, a pole piece (not shown), air gap 470, and a top piece (not shown). The magnet is configured to generate a magnetic field and is fitted over the pole piece, and creates an air gap 470 between the magnet and the pole piece. The pole piece is configured to direct the magnetic field generated by the magnet in air gap 470.

System 400 further includes vents 420, which allow air generated by the moving diaphragm 401 and moving motor assembly 410 to escape.

When an audio drive signal (i.e., current to generate a magnetic force) is applied, diaphragm 401 moves in the direction indicated at 430 and motor assembly 410 moves in the direction indicated at 432. While Fin 430 is equal and opposite as Fin 432 on each of motor assembly 410 and diaphragm 401, because of the larger mass of motor assembly 410 relative to diaphragm 401, motor assembly 410 experiences substantially less acceleration than diaphragm 401. In some implementations, motor assembly 410 is approximately 30 times heavier than diaphragm 401, and therefore experiences approximately 30 times less acceleration than diaphragm 401. In some implementations, an acoustic mass is formed in motor assembly 410 to enable the matching of the acoustic load impedances of the two moving masses.

Figure 5:
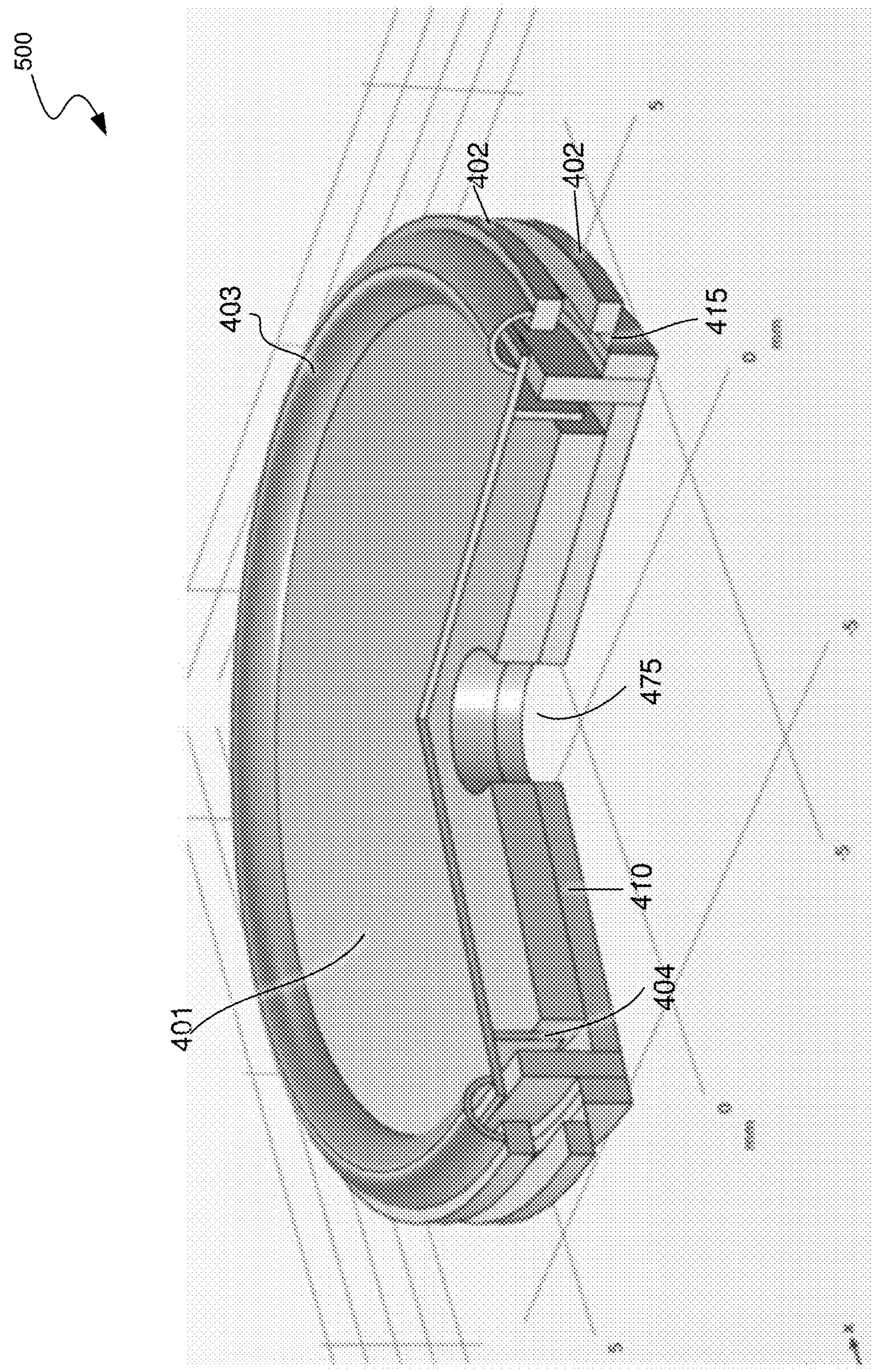
FIG. 5 is a perspective view illustrating a speaker system used for some implementations of the present technology.

FIG. 5 is a perspective view illustrating a speaker system 500 used for some implementations of the present technology. Similar to speaker system 400, speaker system 500 includes diaphragm 401, fixed frame 402, surround 403, voice coil 404, motor assembly 410, and spring 415. While speaker system 500 is circular in shape, in other embodiments, the speaker system may be of any other suitable shape.

FIG. 5 illustrates a motor hole 475 creating an acoustic mass in the center of motor assembly 410. Motor hole 475 provides an acoustic mass that is tuned to be approximately a constant factor N times higher than the acoustic mass associated with the front and back waveguides that load the first moving mass (i.e., diaphragm) when it is moving. The factor N is approximately equal to the ratio of the second moving mass to the first moving mass. This ratio is also approximately equal to the ratio of the second moving mass suspension (i.e., spring 415) stiffness to the first moving mass suspension (i.e., surround 403) stiffness. Motor hole 475 may be covered by a resistive mesh to match with same scale factor N of the resistive part of the acoustic load on the front and back waveguides.

Figure 6:
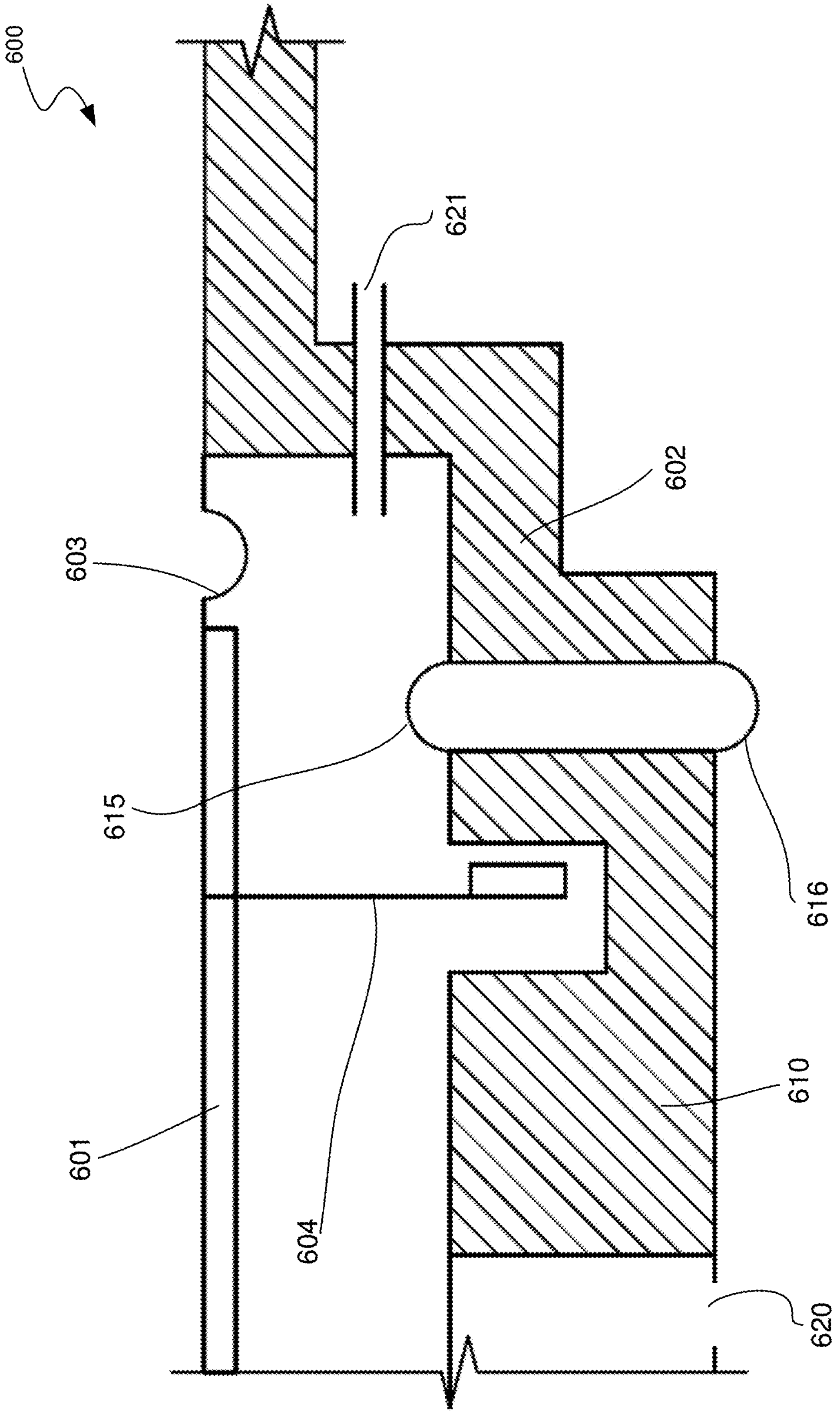
FIG. 6 is a perspective view illustrating a speaker system used for some implementations of the present technology.

FIG. 6 is a perspective view illustrating a speaker system 600 used for some implementations of the present technology. Speaker system 600 includes dual plane decoupling springs 615 and 616. Similar to speaker system 400, speaker system 600 includes diaphragm 601, fixed basket/frame 602, surround 603, voice coil 604, motor assembly 610 with basket, and vents 620, 621.

Speaker system 600 includes dual plane decoupling springs 615, 616. The dual plane suspension increases the speaker system's robustness to drops and rocking. In some implementations, springs 615, 616 do not create a seal between the motor and fixed frame, and are instead segmented such that air may flow between the springs, or the springs can include holes in the structure for ventilation.

As shown in FIGS. 4-6, the secondary suspension (i.e., decoupling spring) can be single or dual plane suspension in some implementations, and can be various types of suspensions such as a flat spring or half roll spring. The secondary suspension can be tuned to a frequency approximately the same as the fundamental resonance of the speaker system. The material of the secondary suspension can match the material of the primary suspension providing them similar damping properties. The secondary suspension can be stiffer than the primary suspension, to support the heavier motor assembly.

In some implementations, the secondary suspension may be a spring that is linear during normal operation of the speaker system, and becomes non-linear and stiffening when the displacement of the spring exceeds the normal operating displacement. This non-linearity is designed into the spring, which can be a flat spring or curved spring (e.g., half roll) by allowing for the spring to deform in bending during normal operation (i.e., low/operating displacement) and to deform by extension/tension at large displacements. This can be accomplished by using a short span flat spring, or if the spring is curved, making the free length of the curved spring such that at large displacements the spring goes taut.

Figure 7:
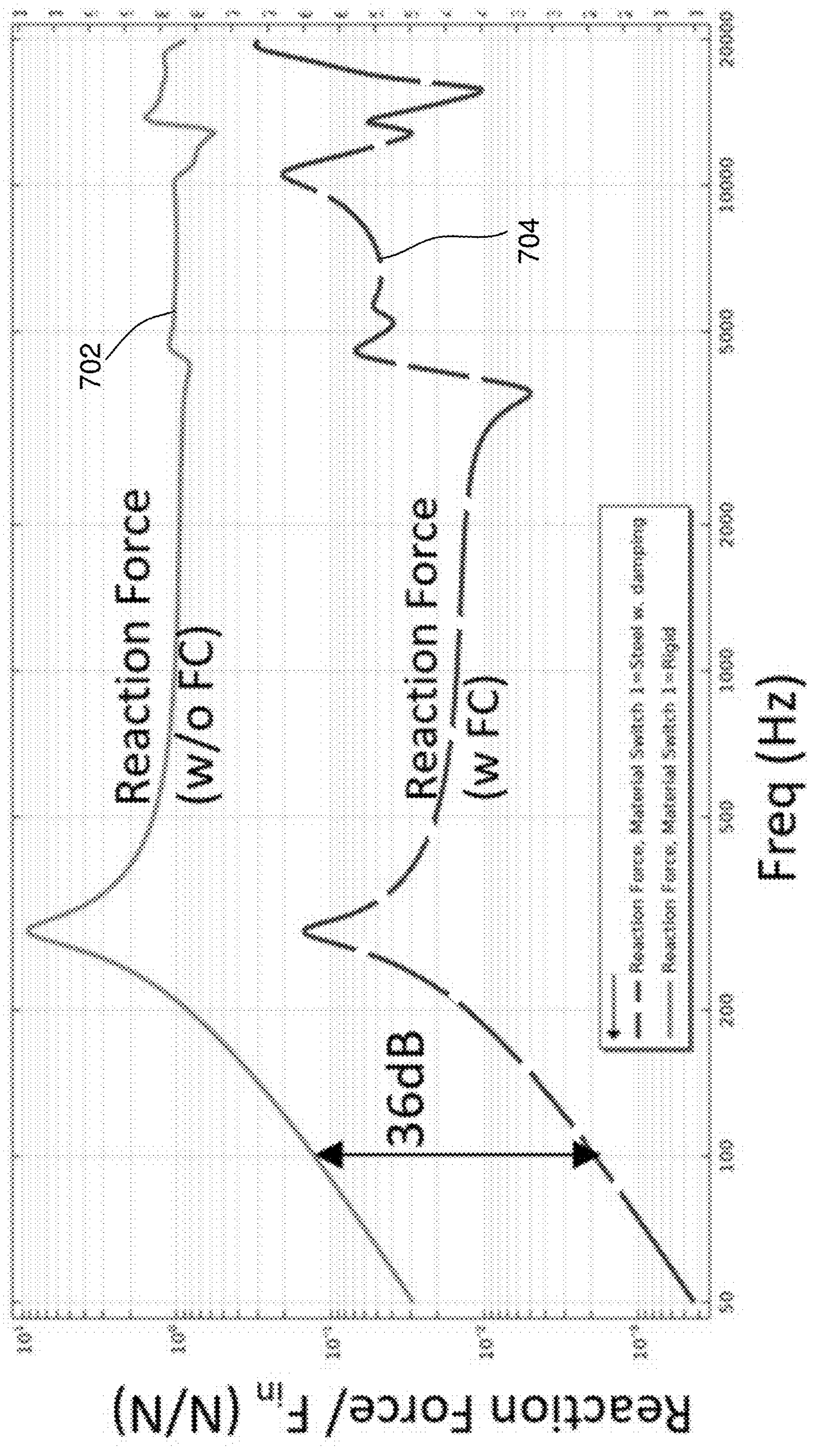
FIG. 7 graphically illustrates the effects of force canceling on the simulated reaction force with known speaker systems and a speaker system used for some implementations of the present technology.

FIG. 7 graphically illustrates the effects of force canceling on the simulated reaction force with known speaker systems and a speaker system used for some implementations of the present technology. The reaction force refers to the net force transferred to the fixed frame while the speaker is in use. Curve 702 represents reaction force without force cancelation (i.e., the secondary suspension is rigid as in known speaker systems), while curve 704 represents the reaction force with force cancelation (i.e., using a decoupling spring as with implementations of the present technology). The example for which force cancelation is enabled (curve 704) experiences an approximate 36 dB attenuation in comparison to curve 702.

Figure 8:
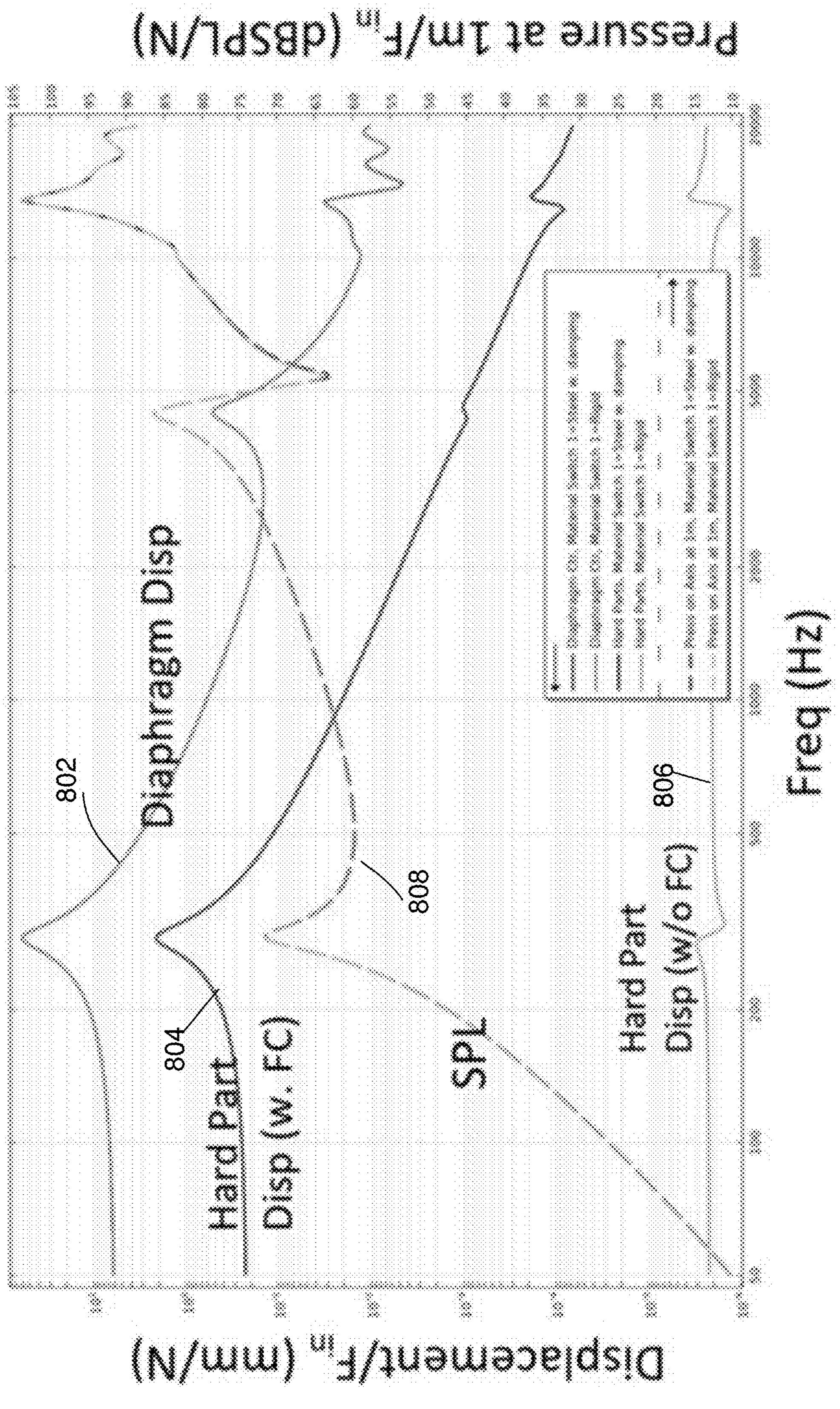
FIG. 8 graphically illustrates the displacement of the diaphragm and the motor assembly for a speaker system with known speaker systems and a speaker system used for some implementations of the present technology.

FIG. 8 graphically illustrates the displacement of the diaphragm and the motor assembly for a speaker system with known speaker systems and a speaker system used for some implementations of the present technology. Curve 802 represents the displacement of diaphragm, while curve 804 represents the displacement of the motor assembly (referred to in FIG. 8 as the "Hard Part") with force cancelation (i.e., with implementations of the present technology) and curve 806 is without force canceling (i.e., known speaker system). The displacement of the motor assembly is approximately 30 times less compared to the diaphragm at curve 804, and therefore the motor assembly requires significantly less energy for it to vibrate than the first moving mass. FIG. 8 further illustrates sound pressure level (SPL) curves with and without force canceling, which are shown as overlapped, indicating that acoustic output is not impacted by force canceling. SPL was measured at a one-meter distance from the speaker system and takes into account radiation from both sides of the speaker system.

Figure 9A:
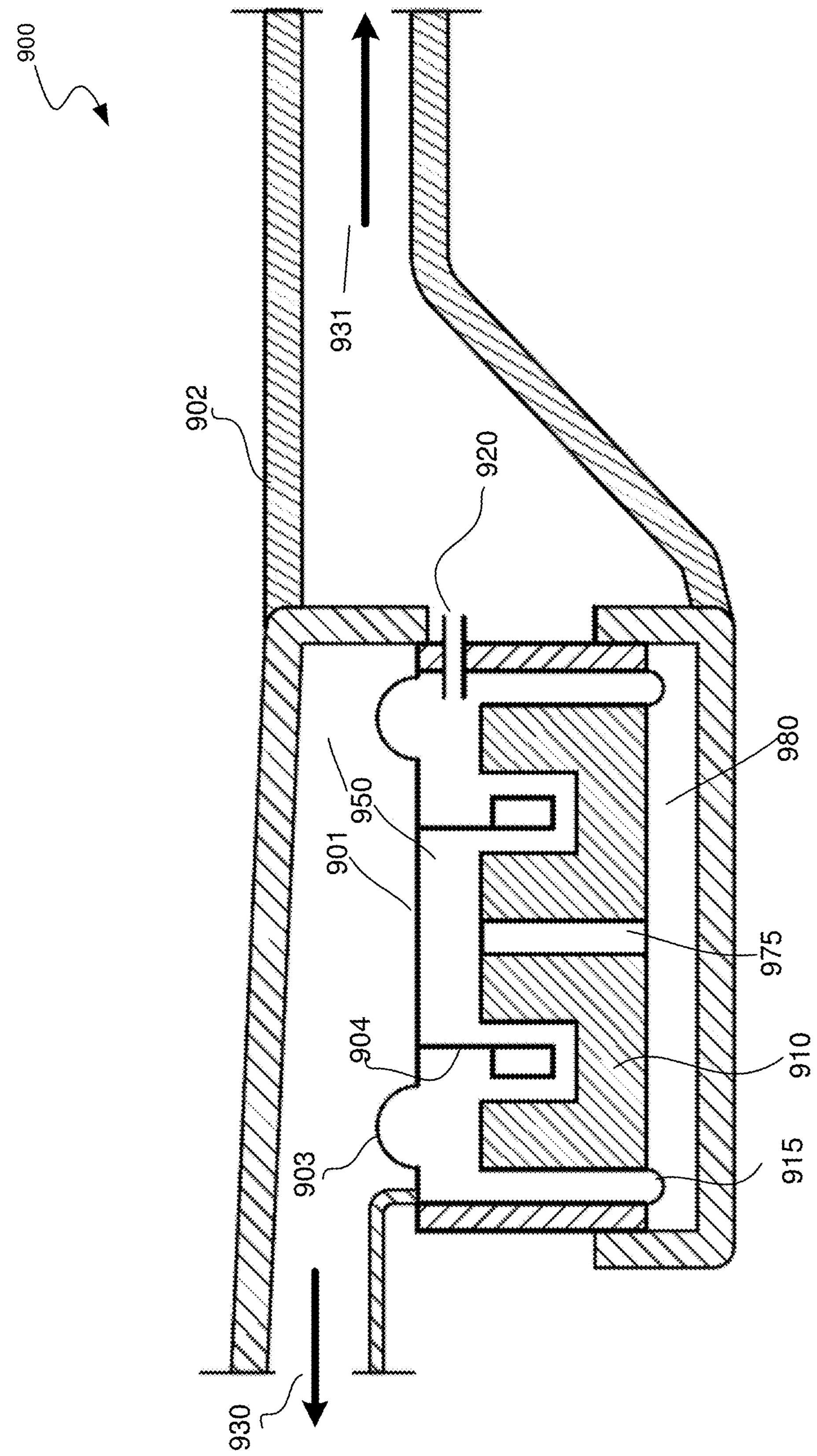
FIGS. 9A-C are cross-sectional views illustrating speaker systems used for some implementations of the present technology.

FIG. 9A is a cross-sectional view illustrating a speaker system 900 used for some implementations of the present technology. Similar to speaker systems 400, 500 and 600, speaker system 900 includes diaphragm 901, fixed frame 902, surround 903, voice coil 904, motor assembly 910 and spring 915. FIG. 9 further illustrates an motor hole or acoustic mass 975, a vent 920, a front port/waveguide 930 and a back port/waveguide 931.

In contrast to FIGS. 4 and 6, FIG. 9A is a cross-section of the entire circular speaker system. Therefore, FIG. 9 illustrates elements such as voice coil 904 twice, on either side of motor hole 975.

Implementations of the speaker system form a dipole configuration, in which sound is radiated from both the front and back to a local area. As the voice coil moves the diaphragm in an up and down motion, the diaphragm generates sound pressure waves that radiate from the front of the speaker through the front waveguide. A back waveguide is formed in part by the back surface of the diaphragm and the top surface of the motor assembly. The waveguides are configured to vent airflow through a front port and a back port.

FIG. 9A illustrates the front and back waveguides, 930, 931 as well as a volume 980 behind the second moving mass 910 that vents to the front of the second mass via acoustic mass 975, which is a small hole in the center of the second moving mass. Both the volume 980 behind the second moving mass and acoustic mass 975 are tuned such that changes to the acoustic volumes 950 in front and behind the diaphragm 901 (caused by movement of diaphragm 901) create opposite forces on motor assembly 910, at least partially cancelling out vibrations of motor assembly 910. Therefore, there is symmetry between the first and second moving mass systems, discussed in detail below in conjunction with FIG. 10 below.

The practical effect of adding the tuned back volume 980 and acoustic mass 975 in the motor assembly is that a 15 dB+ force canceling performance can be maintained over a wide frequency range even when there is significant acoustic loading from the waveguides on the diaphragm.

The sealed volume 980 behind the motor assembly provides an acoustic compliance that is tuned to be a constant factor N times lower than the acoustic compliance associated with the front and back waveguides that load the diaphragm when it is moving. The factor "N" is approximately equal to the ratio of the second moving mass to the first moving mass. This ratio is also approximately equal to the ratio of the second moving mass suspension stiffness to the first moving mass suspension stiffness.

In some implementations, the front port 930 is positioned to provide content towards an ear of the wearer, and the back port 931 is positioned to provide content into a local area of the headset, thereby forming a dipole. Because of the air venting in the design, the volume velocity from the front of the motor assembly is equal and opposite to that off the back of the motor assembly. This allows for cancellation of any radiation due to the suspended hard parts, so that now there is only one effective radiator without peaks and dips in the pressure frequency response due to the interaction between two radiators.

Figure 9B:
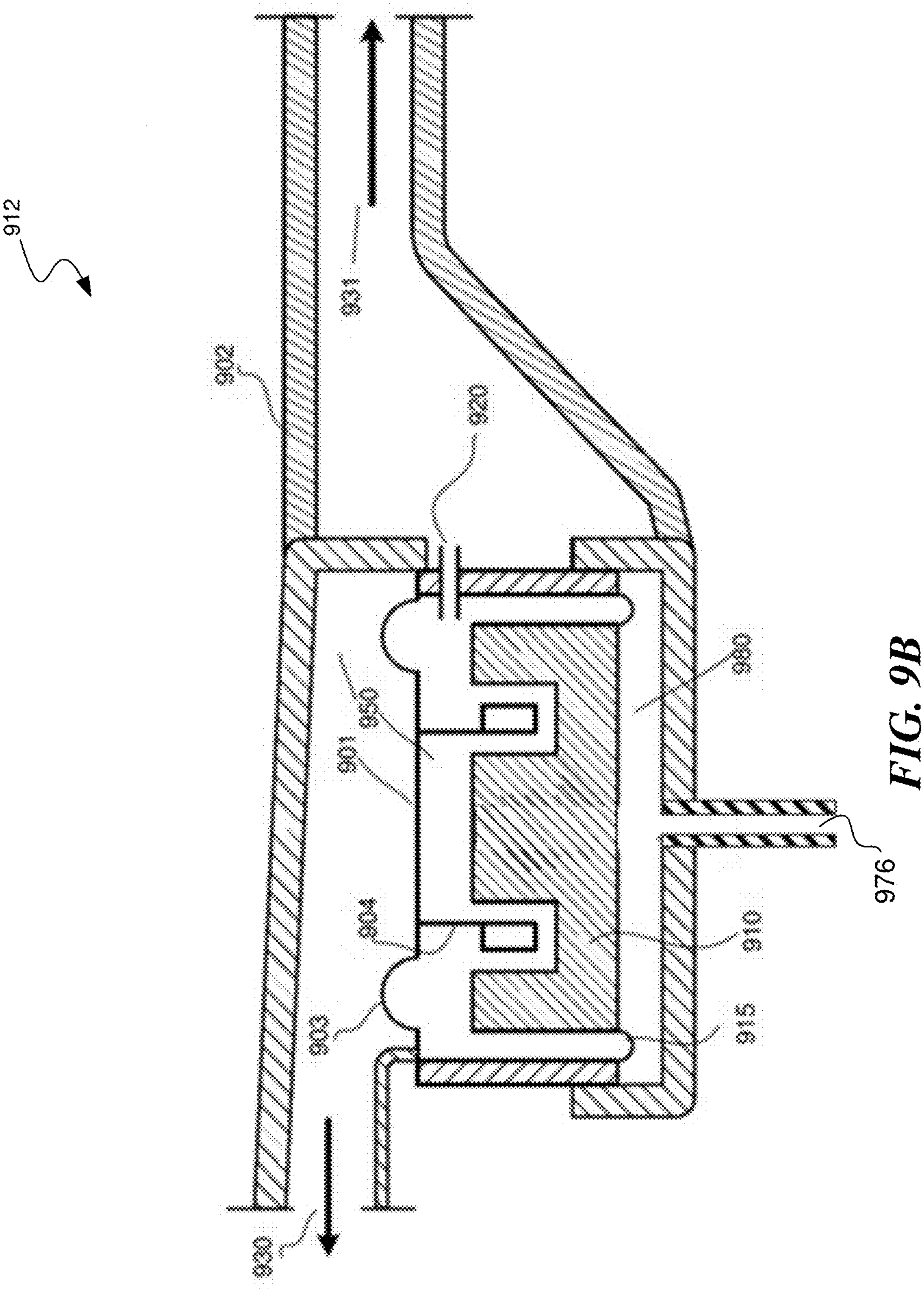

FIG. 9B is a cross-sectional view illustrating a speaker system 912 used for some implementations of the present technology. Speaker system 912 is similar to speaker system 900 of FIG. 9A, except it includes a tube/opening 976 at the bottom of the housing and no hole in the center of the motor assembly.

Figure 9C:
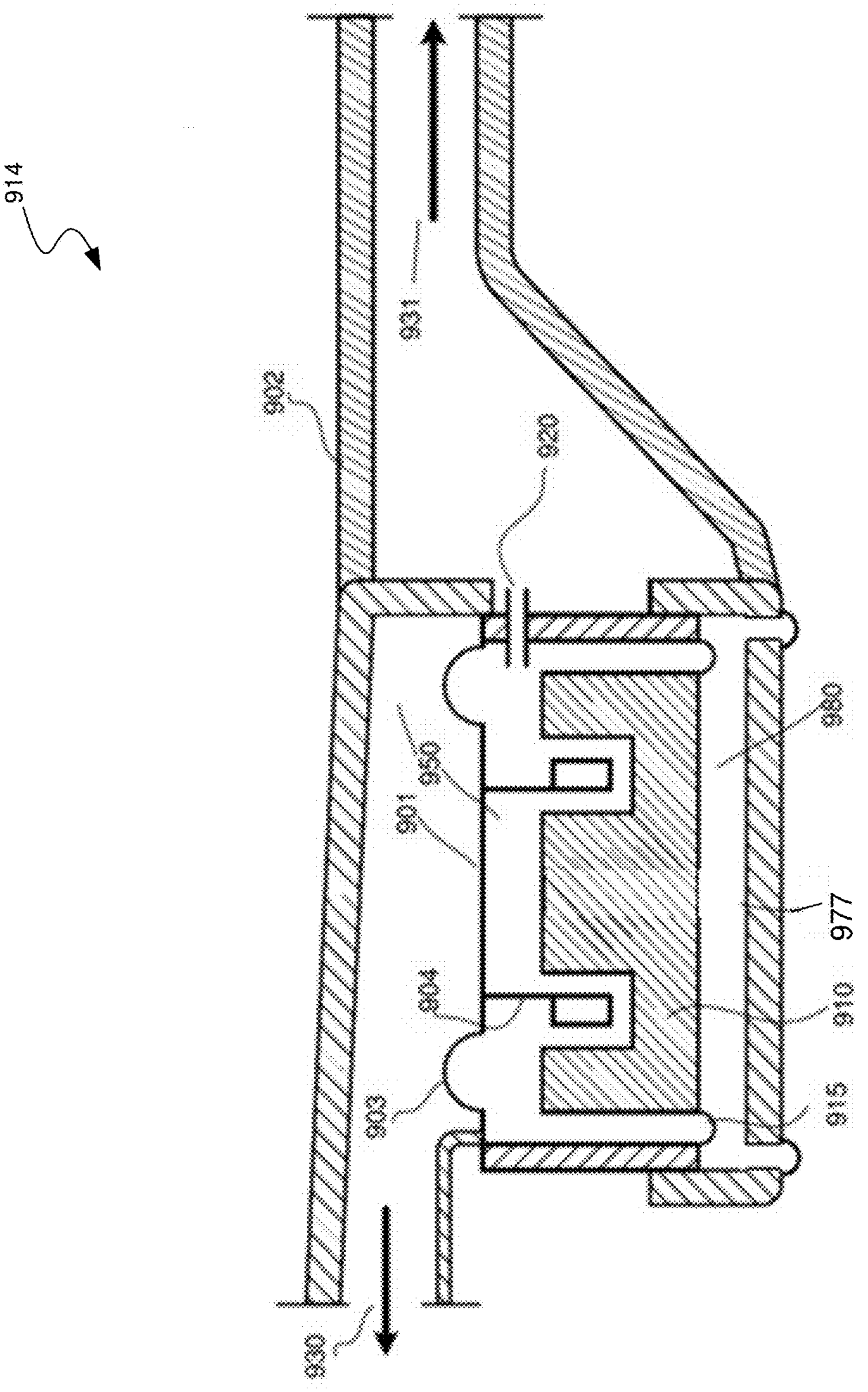

FIG. 9C is a cross-sectional view illustrating a speaker system 914 used for some implementations of the present technology. Speaker system 914 is similar to speaker system 900 of FIG. 9A, except it includes a passive radiator 977 below the motor assembly and no hole in the center of the motor assembly. Although the diameter of passive radiator 977 is shown as approximately the same diameter or slightly larger diameter as motor assembly 910, in other implementations the diameter may vary, and it can have a substantially smaller diameter than motor assembly 910.

Figure 10:
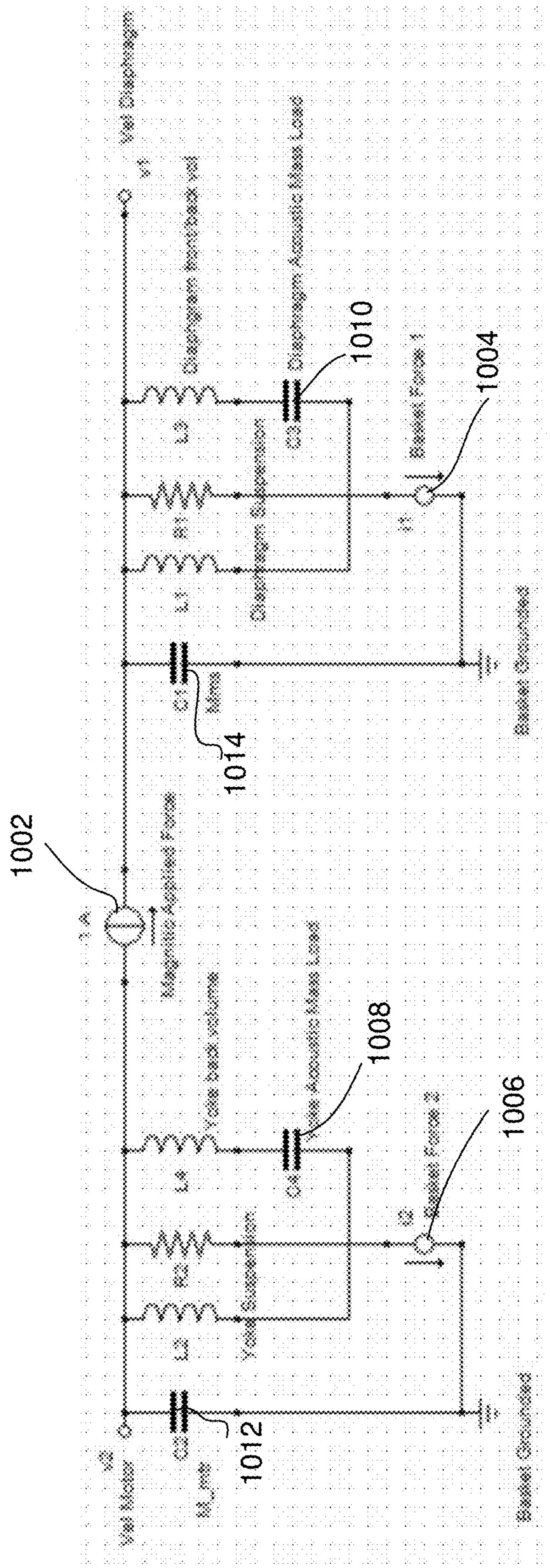
FIG. 10 illustrates an electrical circuit analogy for the dynamic behavior using lumped parameters of the mechanical/acoustical system of implementations of the present technology. In this analogy, the across variable is linear velocity, instead of voltage, and the through variable is force, instead of current.

FIG. 10 illustrates an electrical circuit analogy for the dynamic behavior using lumped parameters of the mechanical/acoustical system of implementations of the present technology. In this analogy, the across variable is linear velocity, instead of voltage, and the through variable is force, instead of current. Current source 1002, labeled "Magnetic Applied Force", represents the magnetic force pushing in an equal and opposite direction on the voice coil (and attached "soft parts") and motor yoke (and attached "hard parts"). All the elements on the right of 1002 are the components that include the speaker soft part dynamics, including the voice coil, diaphragm/cone, surround, and the acoustic load on the diaphragm which generates a pressure on the enclosure above the diaphragm. They capture, for example, the spring force from the surround that is acting on the housing that needs to be canceled, the force to move the soft parts mass, as well as the acoustic pressure forces above the diaphragm that are acting on the housing that need to be canceled. The net force acting on the housing/basket/enclosure from the soft parts is represented by current sensor 1004, labeled "Basket Force 1."

All the elements to the left of 1002 govern the forces and velocity of the moving motor assembly, such as the motor spring/suspension force, which is there to cancel the surround spring force, as well as the force that is transmitted to the housing from the pressure generated by the moving motor, which is there to cancel the pressure force generated above the diaphragm. The net force acting on the housing/basket from the hard parts is represented by the current sensor 1006, labeled "Basket Force 2."

For simplicity, the acoustic loads are represented by capacitors 1008, 1010 (acoustic masses) but in reality would also be some damping (resistive) and compliant (inductance) elements in the acoustic load representation to make it more accurate, especially at higher frequencies.

In order for there to be perfect force canceling on the housing/basket/enclosure, current sensor 1004 must be equal to current sensor 1006. This can be achieved by a design with the correct lumped parameter values, such that the acoustic load impedance of every element on the left side is scaled (by the same factor) to the impedance of its corresponding element on the right side. So if the moving motor assembly mass C2 at 1012 is 30 times that of the moving soft part mass C1 (Mms) at 1014, then all other mechanical impedances of elements on the left side must also be 30 times greater than their corresponding elements on the right.

In some implementations, the force cancelling performance of the speaker system may be improved to account for manufacturing imperfections, by modifying attributes of components of the speaker system. In some implementations, an additional mass may be added to the motor assembly (e.g., to the yoke/hard parts) to adjust the tuning frequency of the second mass to approximately that of the first mass. In other implementations, the active length of the secondary suspension (e.g., flat spring) is adjusted to change the compliance of the second mass's suspension.

Figure 11:
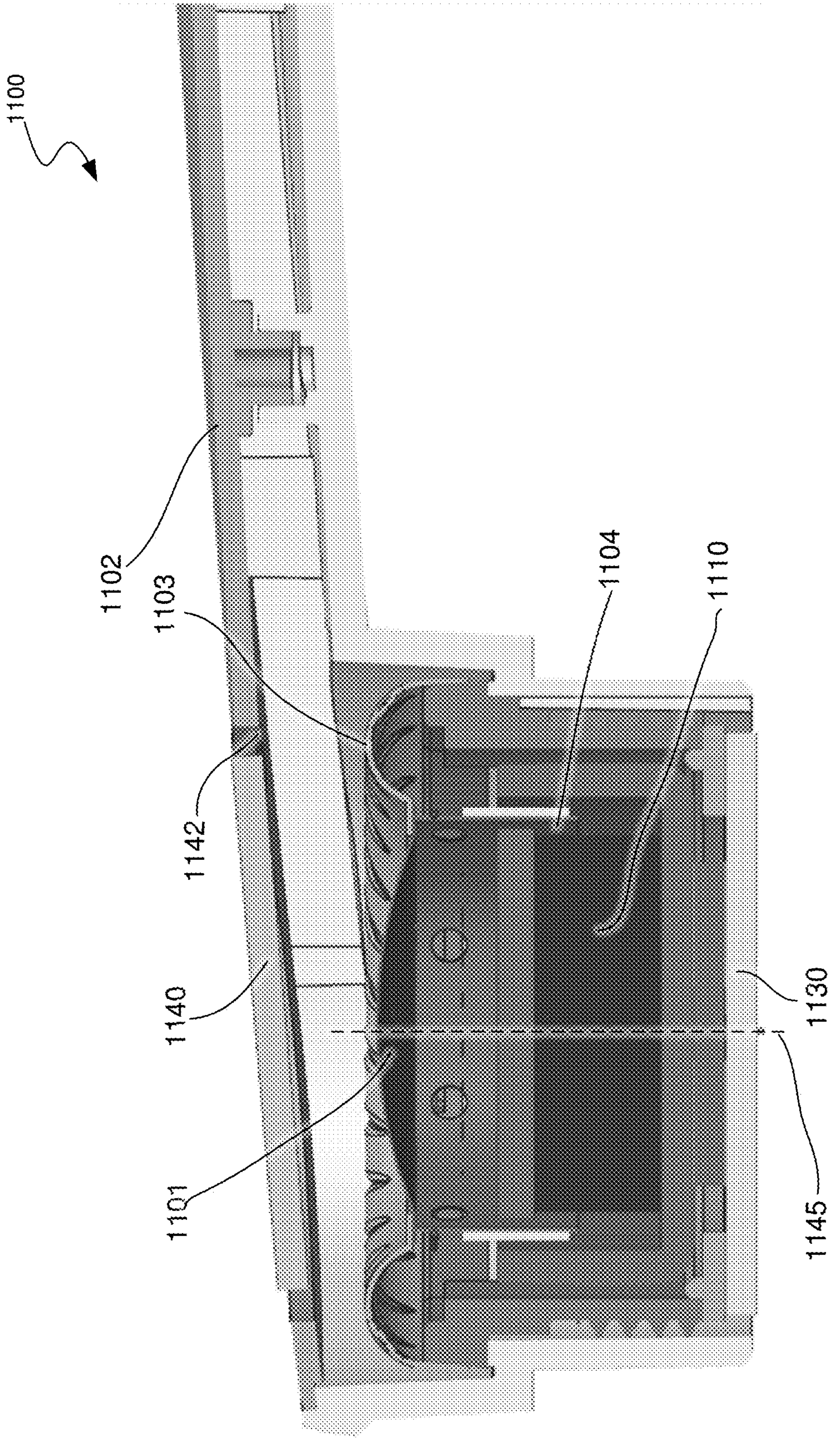
FIG. 11 is a cross-sectional view illustrating a speaker system used for some implementations of the present technology.

FIG. 11 is a cross-sectional view illustrating a speaker system 1100 used for some implementations of the present technology. Speaker system 1100 includes diaphragm/cone 1101, fixed frame/enclosure 1102, cone surround 1103, voice coil 1104 and motor assembly 1110. Speaker system 1100 further includes a yoke suspension 1130 and a passive radiator 1140, in the form of a disk.

Yoke suspension 1130 can be implemented with Thermoplastic Polyurethane (TPU) rubber and provides a suspension of motor assembly 1110, similar to the functionality of spring 915 of FIG. 9A. Passive radiator 1140 is coupled to fixed frame 1102 via a suspension 1142 (e.g., a half roll surround or spring). In some implementations, the approximate mid-point of suspension 1142 is approximately the same distance from the centerline 1145 of cone 1101 and motor assembly 1110 as the approximate mid-point of suspension/surround 1103. Speaker system 1100, in some implementations, does not need a bottom cap, plug or motor hole, such as acoustic mass/motor hole 975 of speaker system 900 of FIG. 9A. Instead, yoke suspension 1130 is properly tuned and passive radiator 1140 absorbs the forces that would normally be pushing against the top of the enclosure. In the implementation of FIG. 11, passive radiator 1140 is angled at approximately 5 degrees relative to horizontal of motor assembly 1110 to minimize height impact due to device design constraints. In other implementations, passive radiator 1140 can be generally horizontal/parallel relative to motor assembly 1110.

In some implementations, the operating frequency of speaker system 1100 is generally above the natural frequency of passive radiator 1140. Further, in some implementations, the natural frequency of yoke suspension 1130 approximately matches the natural frequency of cone 1101 while mounted within the module/enclosure, since acoustic mass is only being added to the top of the enclosure, which results in <0.5 dB loss in maximum low frequency acoustic output.

Figure 12A:
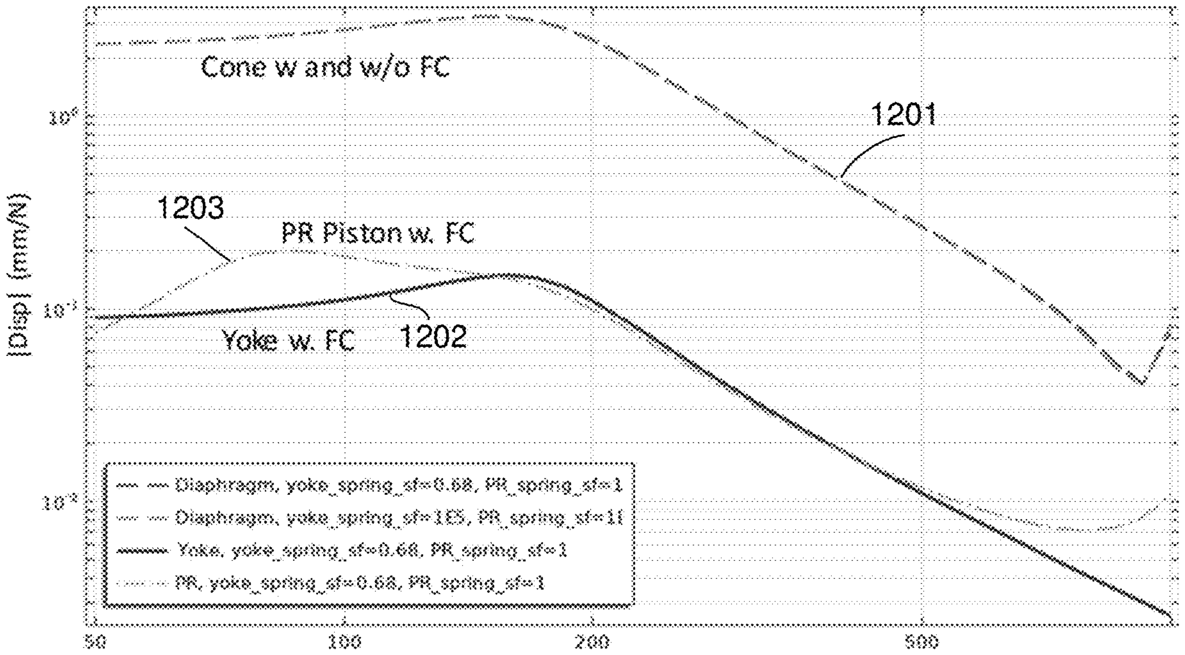
FIG. 12A graphically illustrates the effects of force canceling used for some implementations of the present technology.

FIG. 12A graphically illustrates the effects of force canceling used for some implementations of the present technology. In the implementation of speaker system 1100 shown in FIG. 12A, passive radiator 1140 is tuned at 67 Hz and has a mass of 2.9 g. Curves 1201 show the displacement of cone 1101 with and without force canceling (FC) (e.g., with and without the presence of passive radiator (piston) 1140 and flexible yoke suspension 1130)—as shown by curves 1201, there is very little difference between the displacement of cone 1101 with and without force canceling. Curve 1202 shows the displacement of yoke suspension 1130 with FC. Curve 1203 shows the displacement of passive radiator 1140 (PR) with FC. As shown, with FC, motor assembly 1110 mass with yoke suspension 1130 stiffness is very close in resonance (at about 175 Hz) to cone 1101 mass and surround 1103 stiffness.

Figure 12B:
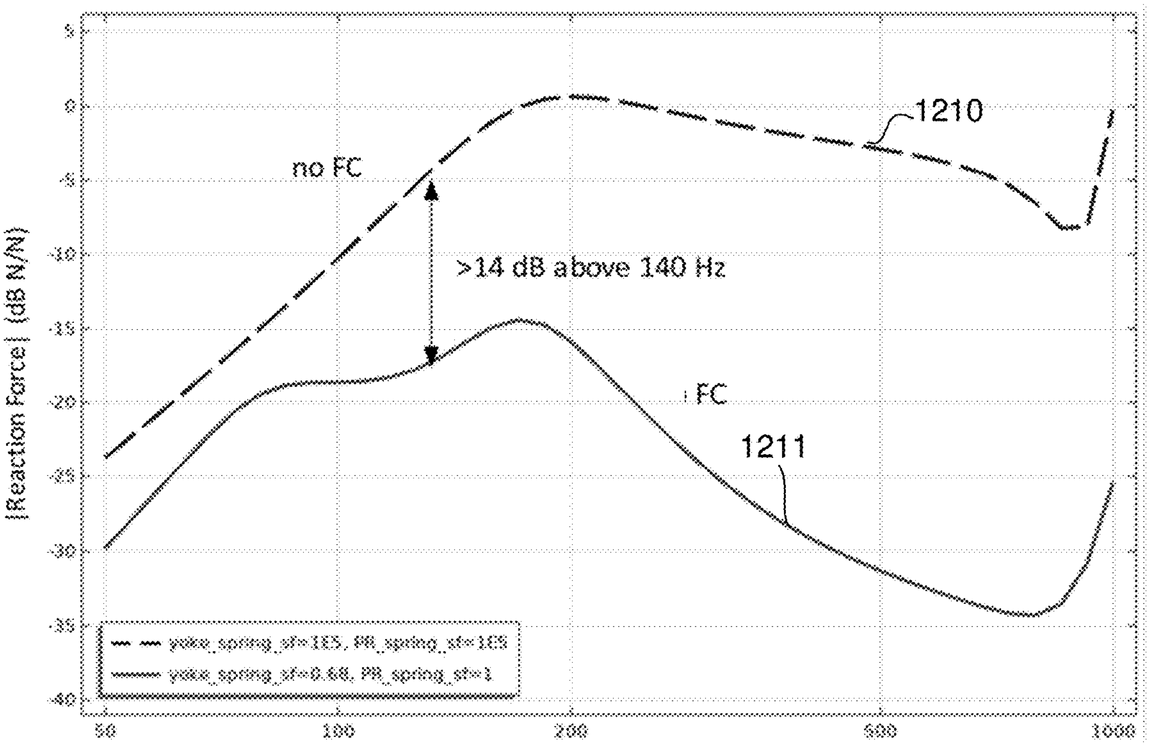
FIG. 12B graphically illustrates the effects of force canceling used for some implementations of the present technology.

FIG. 12B graphically illustrates the effects of force canceling used for some implementations of the present technology. As shown by curves 1210 and 1211, using the same implementation of FIG. 12A, the reaction force with no FC (curve 1210) is approximately 14 dB or more above 140 Hz compared to with FC (curve 1211), illustrating the implementations of the invention result in >14 dB force cancellation above 140 Hz.

Figure 13A:
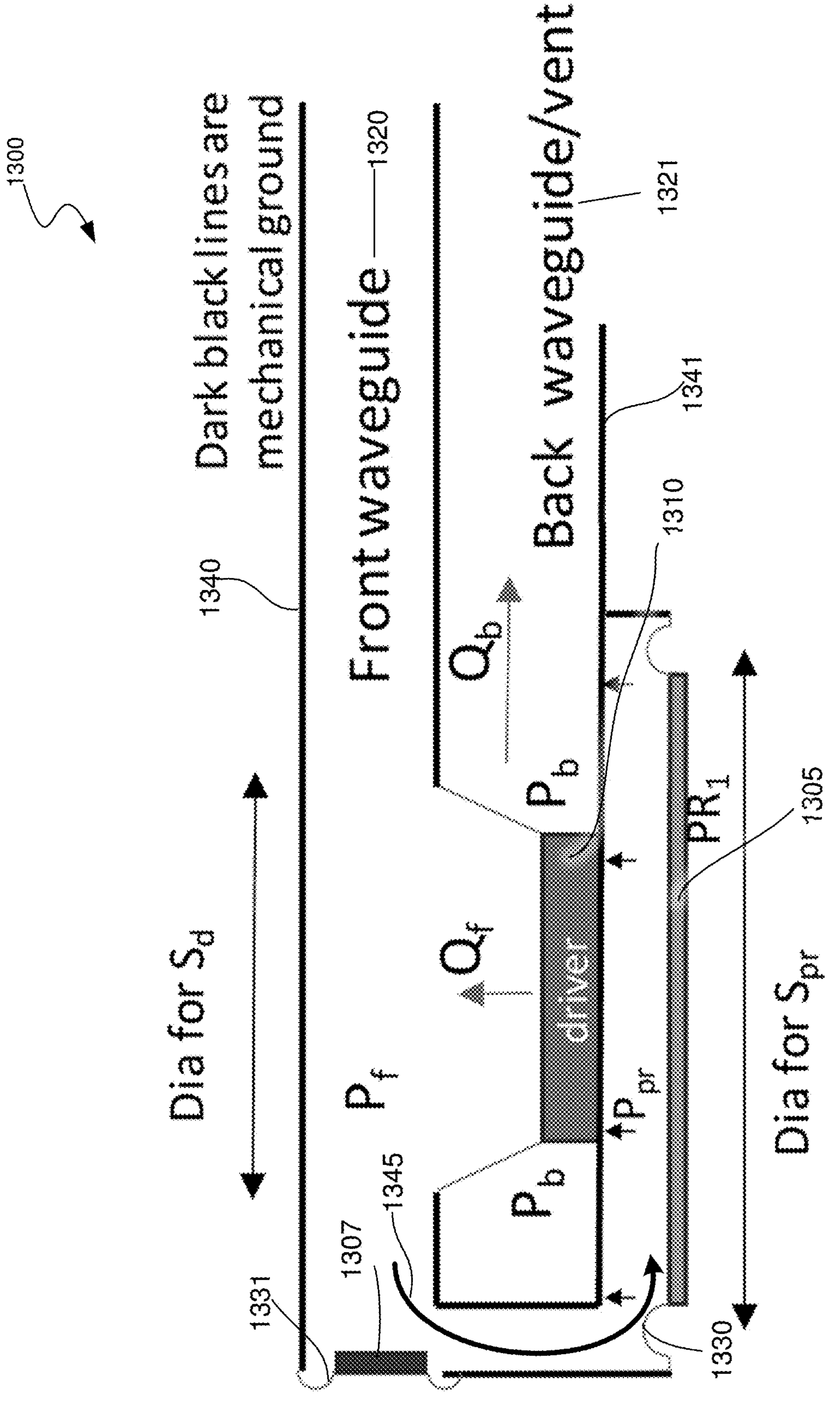
FIG. 13A is a cross-sectional view illustrating a speaker system used for some implementations of the present technology.

FIG. 13A is a cross-sectional view illustrating a speaker system 1300 used for some implementations of the present technology. Speaker system 1300, in contrast to previously disclosed implementations, has a fixed motor assembly/driver 1310 (i.e., coupled rigidly to the enclosure/mechanical ground), so no yoke or other suspension is used to cancel forces. Speaker system 1300 includes a front waveguide 1320, back waveguide/vent 1321, a bottom passive radiator (PR) 1305 located below driver 1310, a side passive radiator 1307, top of enclosure/fixed frame 1340 and bottom of enclosure 1341. Passive radiators 1305 and 1307 are coupled to the enclosure via suspensions/surrounds 1330, 1331, respectively.

In operation, as driver 1310 moves up, it creates a front force Fr which drops as it moves down front waveguide 1320, and generates a corresponding downward force as the cone accelerates/moves, since the driver is rigidly attached to the enclosure. Vibration can be reduced by cancelling the downward force from the cone accelerating. An acoustic load pressure $P_f$ is generated above the driver as it moves up and down, pushing on top of front waveguide 1320, causing a force on enclosure 1340, in response to the acceleration of the mass. The same equalizing pressure, because system 1300 is generally sealed, is moved/shunted across the driver in the back of system 1300, as indicated by arrow 1345, to generate pressure $P_{pr}$, which moves PR 1305 and provides an upward force on the bottom of enclosure 1341 from below to cancel the downward force from the acceleration of the cone, which results in reduced net forces applied to the ridged frame when the cone is moving up and down (i.e., reaction forces are canceled).

As shown, the driver front pressure is used to cancel a mechanical force imbalance, but other implementations can similarly use driver back pressure. The side passive radiator 1307 (which is optional in some implementations) cancels lateral forces from $P_f$ from imbalanced acoustic loads, such as front waveguide 1320, which otherwise has a wall on one side and an opening on the other side with no wall and low pressure. In some implementations, because passive radiator 1305 operates in the mass-controlled region, its natural frequency can be below the operating frequency range of the device. The force canceling effect of speaker system 1300 (and speaker systems 1350 and 1360 disclosed below) is described as follows:

Assume $P_{pr}=P_f$ at low freqs (P≡pressure)

For force balance, need $P_{pr}*S_{pr}=M_{ms}*accel_{ms}≡M_{ms}*jw*vel_{ms}$ (Mms≡moving mass of driver; jw≡j*velocity in radians; $S_{pr}$≡effective radiating area or passive radiator; $accel_{ms}$≡acceleration of the driver cone; $vel_{ms}$≡velocity of the driver cone)

$P_{pr}=P_f=Q_f*z_f=S_d*vel_{ms}*z_f$ (Q≡vol velocity; $z_f$≡acoustic imped [Pa/(m^3/s)])

$$M_{ms}*jw*vel_{mms}=Sd*vel_{ms}*z_f*S_{pr}$$

Need $S_{pr}=M_{ms}*jw/(S_d*z_f)$ (need $z_f$ mass like, resistance low)

If $z_f$ mechanical impedance is equal to Mms impedance, then $S_{pr}=S_d$, otherwise areas are different.

Figure 13B:
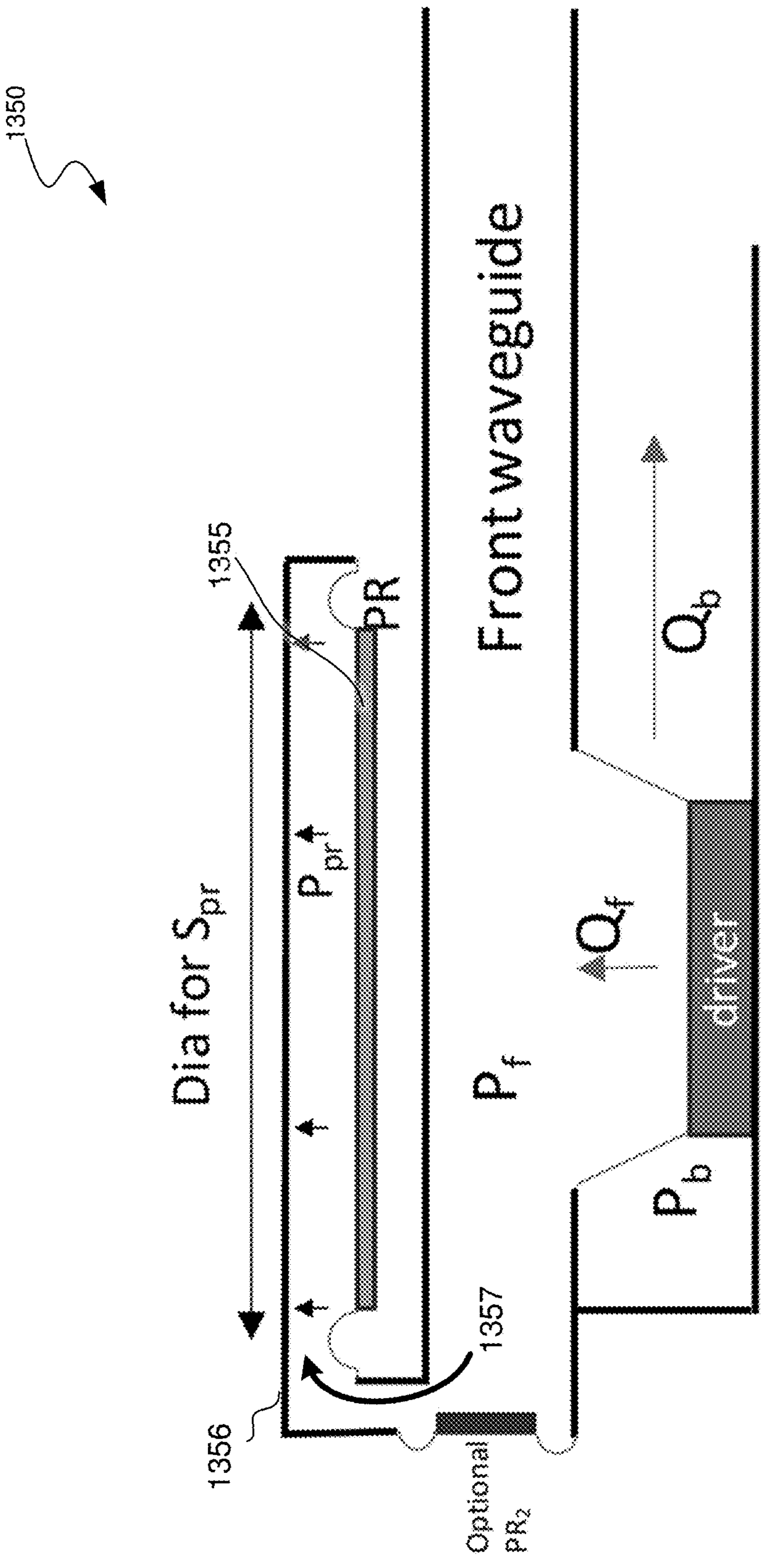
FIG. 13B is a cross-sectional view illustrating a speaker system used for some implementations of the present technology.

FIG. 13B is a cross-sectional view illustrating a speaker system 1350 used for some implementations of the present technology. Speaker system 1350 is similar to speaker system 1300 in that it equalizes pressure $P_f$ with pressure $P_{pr}$ to generate forces on the frame that cancels downward forces due to the acceleration of the cone. However, passive radiator 1355 is located at the top and above the driver and the cone (not shown) instead of below the driver, and the enclosure includes an extra wall 1356. In system 1350, the pressure is shunted above, as indicated by 1357, which generally is a shorter path than shunting below the driver as in system 1350, which can lead to reduced volume, which can be advantageous for the design of the device housing system 1350.

Figure 13C:
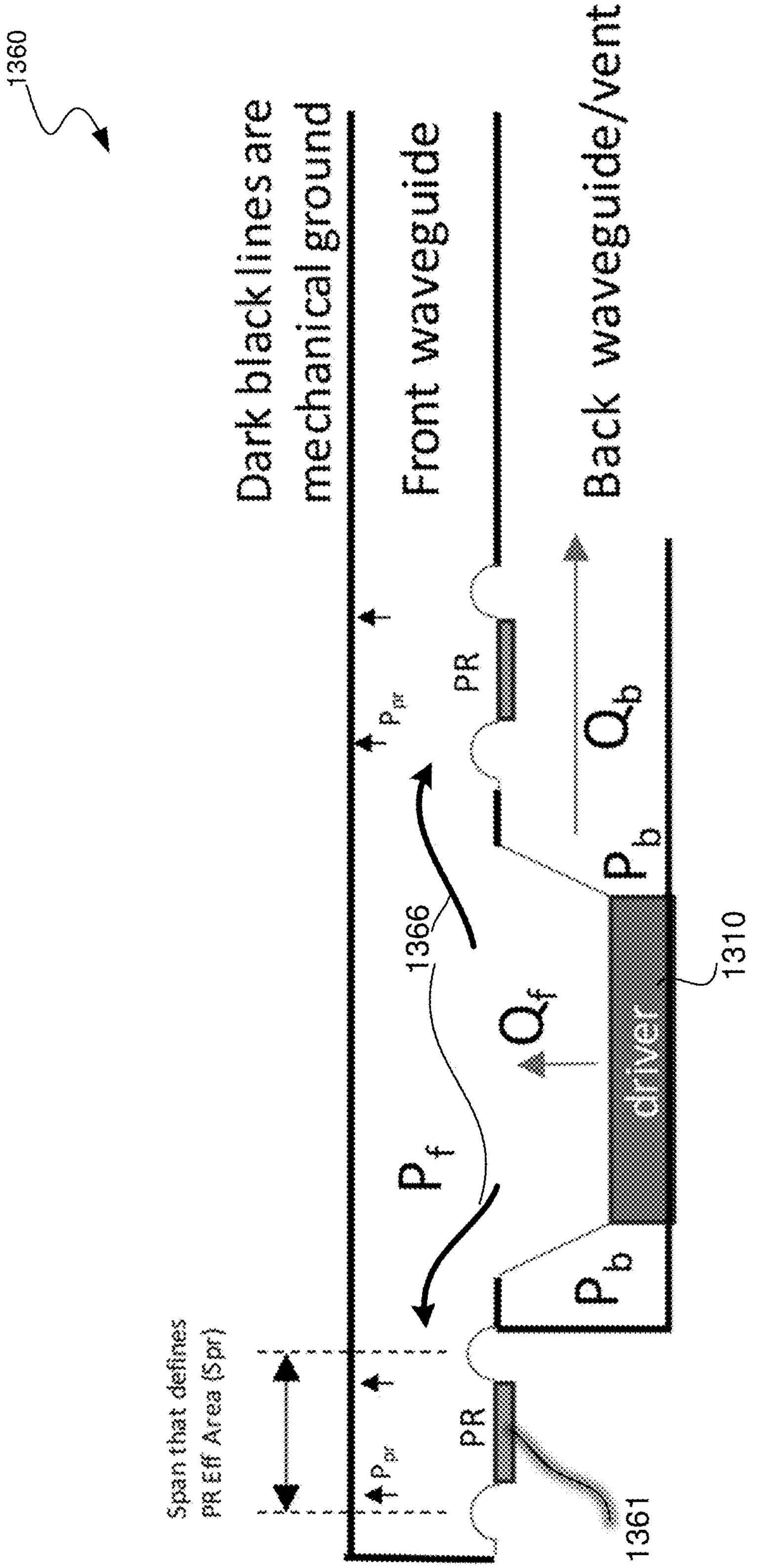
FIG. 13C is a cross-sectional view illustrating a speaker system used for some implementations of the present technology.

FIG. 13C is a cross-sectional view illustrating a speaker system 1360 used for some implementations of the present technology. Speaker system 1360 is similar to speaker system 1300. Speaker system 1360 is similar to speaker system 1300 in that it equalizes pressure $P_f$ with pressure $P_{pr}$ to generate forces on the frame that cancels downward forces due to the acceleration of the cone. However, system 1360 includes a passive radiator 1361 surrounding driver 1310, which results in an even shorter path 1366 on all sides of driver 1310.

In general, a shorter path with the speaker systems means the pressure $P_f$ will be more similar to $P_{pr}$ at the higher frequencies (i.e., the long path will behave like a waveguide with standing waves). The advantage of bottom shunting (e.g., as with speaker system 1300 of FIG. 13A) is that though the path is longer, it might package better since it uses one less wall thickness in the height dimension. The advantage of shunting on all sides (e.g., as with speaker system 1360 of FIG. 13C) is that the force from $P_{pr}$ will be centered on driver and aligned with driver reaction force so as not to create a moment on the enclosure.

Various speaker system elements are not shown in FIGS. 13A-C, including the cone, voice coil, etc.

Figure 14A:
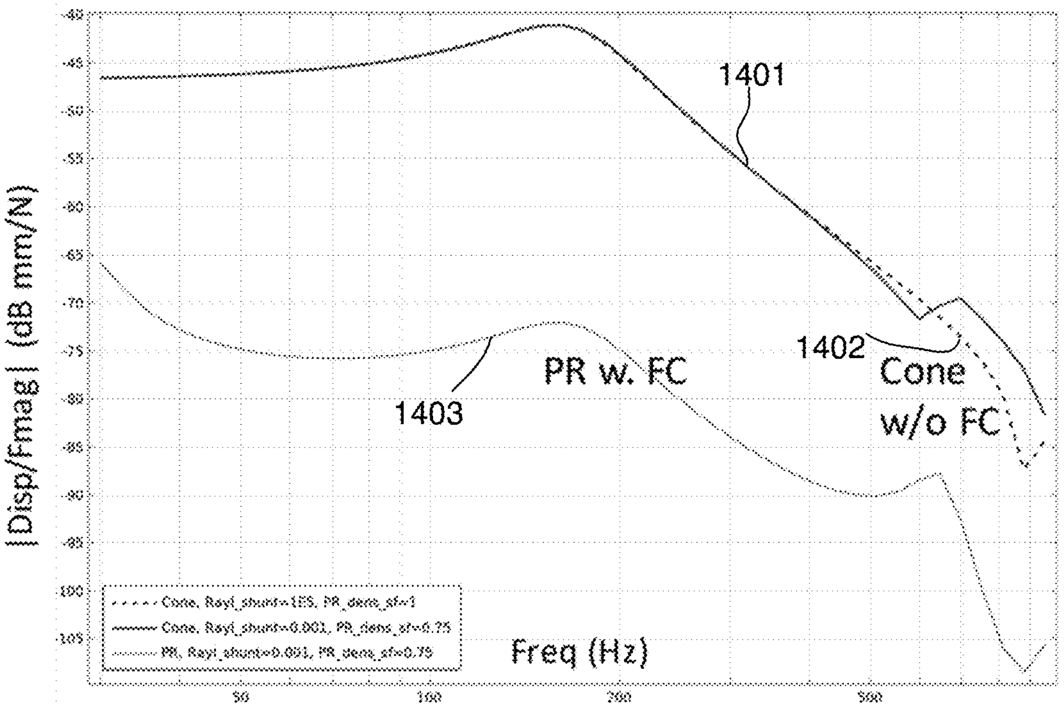
FIG. 14A graphically illustrates the effects of force canceling used for some implementations of the present technology.

FIG. 14A graphically illustrates the effects of force canceling used for some implementations of the present technology. FIG. 14A illustrates force canceling results for an implementation of speaker system 1300 (i.e., no yoke suspension), with passive radiator 1305 located below driver 1310 (in comparison to no force canceling). Curve 1401 shows the displacement of the cone with force canceling in comparison to curve 1402 without force canceling. Curve 1403 shows the displacement of passive radiator 1305 with force canceling. As shown, the driver displacement is generally unaffected (<0.5 db loss of Main Port output). In general, increasing the weight of the PR can reduce the driver volume velocity shunting.

Figure 14B:
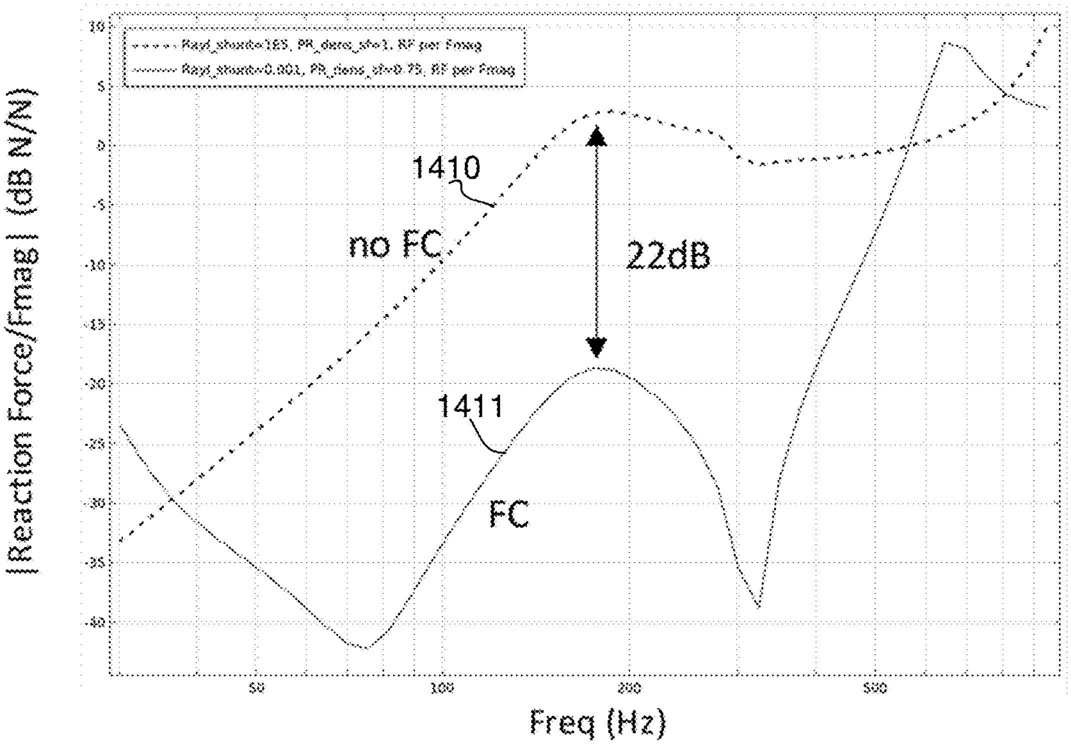
FIG. 14B graphically illustrates the effects of force canceling used for some implementations of the present technology.

FIG. 14B graphically illustrates the effects of force canceling used for some implementations of the present technology. As shown by curves 1410 and 1411, using the same implementation of FIG. 14A, the reaction force with no FC (curve 1410) is approximately >22 dB from 100 Hz to 350 Hz compared to with FC (curve 1411).

Figure 15:
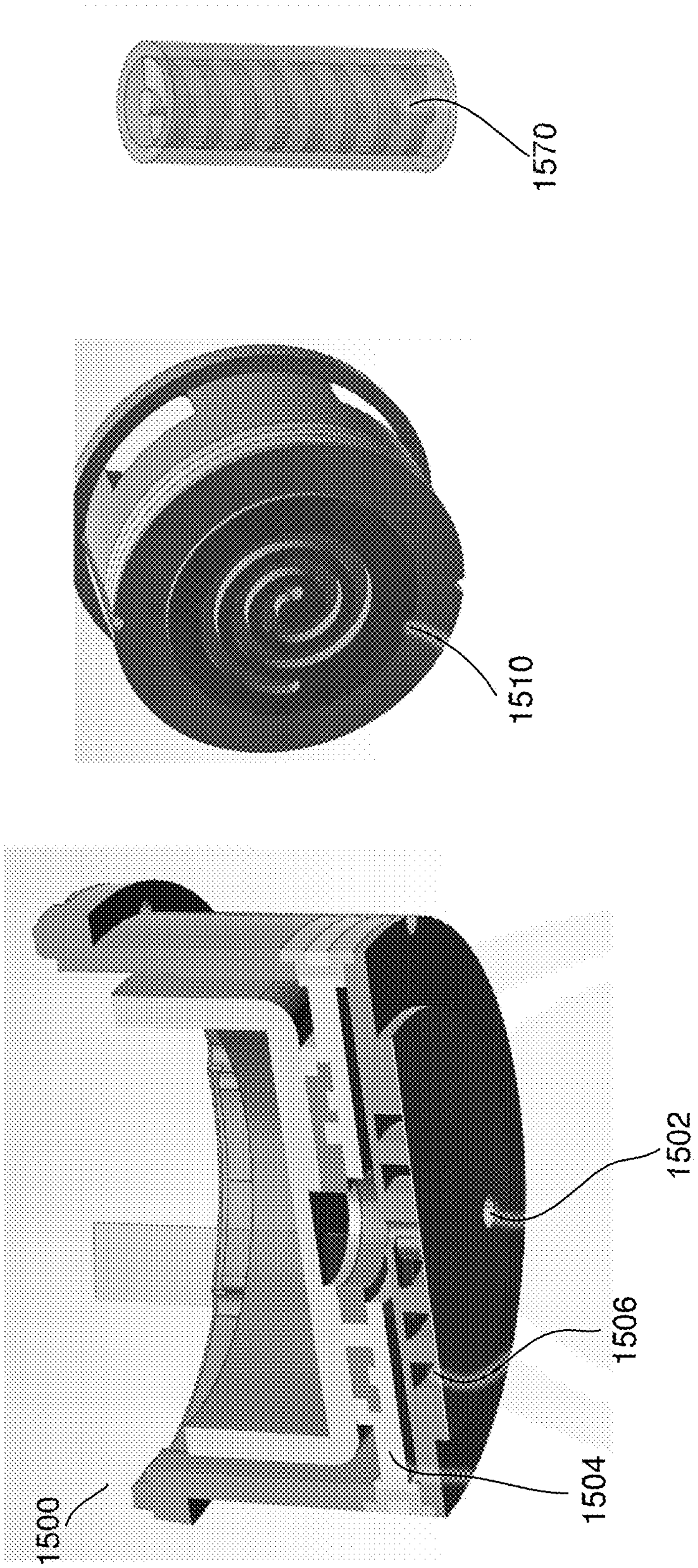
FIG. 15 illustrates additional implementations of the present technology for force canceling speaker systems with a motor hole.

FIG. 15 illustrates additional implementations of the present technology for force canceling speaker systems with a motor hole, such as speaker system 900 of FIG. 9A. With speaker system 900, the motor hole 975 through motor 910 with length "L" cancels acoustic forces from the pressure on top of the cone. The suspension on motor 910 via spring 915, or a yoke suspension, cancels the mechanical forces. However, in some implementations, smaller diameters of the motor hole with a short length causes viscous drag from the walls of the hole. A larger diameter hole would require a longer length to achieve the same acoustic impedance, but in some implementations there is no room for a longer hole.

Therefore, in some implementations, a speaker system 1500 includes a yoke suspension 1504 that includes a cap 1510 that includes a center hole 1502, and a flat spiral hole 1506 and placed below the motor. Therefore, the length of a motor "hole" is effectively increased over the flat plane of the spiral. In other implementations, cap 1510 does not have a center hole and spiral hole 1506 terminates at a motor hole such as motor hole 975.

In other implementations, the motor hole such as motor hole 975 is formed with an internal helical shaped path, such as by inserting an Archimedes screw 1570 into the motor hole. Other implementations can combine spiral cap 1510 with the helical shape.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

In various implementations, the technology includes a speaker system comprising: a fixed frame; a voice coil; a first moving mass comprising a diaphragm, the first moving mass coupled to the fixed frame via a non-rigid first suspension and coupled to the voice coil; a second moving mass, comprising a motor assembly, coupled to the fixed frame via a non-rigid second suspension, wherein the motor assembly is configured to move the voice coil in response to an audio drive signal applied through the motor assembly; and a passive radiator coupled to the fixed frame via a non-rigid third suspension. In some cases, the primary suspension comprises a surround coupled to the diaphragm. In some cases, the secondary suspension comprises a yoke suspension. In some cases, the yoke suspension comprises Thermoplastic Polyurethane (TPU) rubber. In some cases, a first radius, from a central axis of the speaker system to a center of the non-rigid first suspension, is approximately the same as a second radius, from the central axis to a center of the non-rigid third suspension. In some cases, the speaker system further comprises a front waveguide and a rear waveguide. In some cases, an operating frequency of the speaker system is above a natural frequency of the second suspension. In some cases, a natural frequency of the second suspension is approximately the same as a natural frequency of the first moving mass. In some cases, the fixed frame comprises a housing of a wearable device.

In various implementations, the technology includes a speaker system comprising: a fixed frame; a voice coil; a first moving mass comprising a diaphragm, the first moving mass coupled to the fixed frame via a non-rigid first suspension and coupled to the voice coil; and a second moving mass, comprising a motor assembly, coupled to the fixed frame, wherein the motor assembly is configured to move the voice coil in response to an audio drive signal applied through the motor assembly; wherein the motor assembly has an air passage hole which passes air from a region above motor assembly to a region below the motor assembly. In some cases, the air passage includes a helical path through the motor assembly. In some cases, the air passage includes a spiral path running below the motor assembly.

We claim:

1. A speaker system comprising:

a fixed frame;

a voice coil;

a first moving mass comprising a diaphragm, the first moving mass coupled to the fixed frame via a first non-rigid suspension and coupled to the voice coil;

a second mass, comprising a motor assembly, rigidly coupled to the fixed frame; and a first passive radiator coupled to the fixed frame via a second non-rigid suspension;

wherein the diaphragm is configured to move in response to an audio drive signal, causing a pressure to be generated above the diaphragm and a first force to be generated on the fixed frame by the motor assembly; and wherein the fixed frame is configured so that the pressure is shunted to the first passive radiator that is configured to generate a second force in response to the shunted pressure, wherein the second force cancels at least a portion of the first force on the fixed frame.

2. The speaker system of claim 1, wherein the first passive radiator is located below the motor assembly.

3. The speaker system of claim 1, wherein the first passive radiator is located above the motor assembly.

4. The speaker system of claim 1, wherein the first passive radiator surrounds the motor assembly.

5. The speaker system of claim 1, further comprising a second passive radiator coupled to the fixed frame via a third non-rigid suspension across from a waveguide, wherein the second passive radiator is configured to cancel lateral forces generated by the pressure and/or motor assembly.

6. The speaker system of claim 1, wherein the second suspension comprises a decoupling spring.

7. The speaker system of claim 6, wherein the decoupling spring comprises a flat spring.

8. The speaker system of claim 6, wherein the decoupling spring comprises a half roll spring.

9. The speaker system of claim 1, wherein the first suspension comprises a surround coupled to the diaphragm.

10. The speaker system of claim 1, wherein the fixed frame further comprises a path between the motor assembly and the passive radiator for shunting the pressure.

11. The speaker system of claim 1, further comprising a front waveguide and a rear waveguide.

12. The speaker system of claim 1, wherein the fixed frame comprises a housing of a wearable device.

13. A method of operating a wearable device comprising a fixed frame and a speaker system, the method comprising:

applying an audio drive signal to the speaker system, wherein the speaker system comprises A) a voice coil, B) a first moving mass comprising a diaphragm, the first moving mass coupled to the fixed frame via a first non-rigid primary suspension and coupled to the voice coil, C) a second mass comprising a motor assembly rigidly coupled to the fixed frame, and D) a first passive radiator coupled to the fixed frame via a second non-rigid suspension;

wherein the audio drive signal causes the diaphragm to move, causing a pressure to be generated above the diaphragm and a first force to be generated on the fixed frame by the motor assembly; and wherein the pressure is shunted to the first passive radiator, which generates a second force in response to the shunted pressure, wherein the second force cancels at least a portion of the first force on the fixed frame.

14. The method of claim 13, wherein the first passive radiator is located below the motor assembly.

15. The method of claim 13, wherein the first passive radiator is located above the motor assembly.

16. The method of claim 13, wherein the first passive radiator surrounds the motor assembly.

17. The method of claim 13, the speaker system further comprising a second passive radiator coupled to the fixed frame via a third non-rigid suspension across from a waveguide, wherein the audio drive signal causes the second passive radiator to cancel lateral forces generated by pressure and/or the motor assembly.

18. The method of claim 13, wherein the first suspension comprises a surround coupled to the diaphragm.

19. The method of claim 13, wherein the fixed frame further comprises a path between the motor assembly and the passive radiator for shunting the pressure.

20. The method of claim 13, wherein the speaker system further comprises a front waveguide and a rear waveguide.

* * * * *